(12) United States Patent
Nelson et al.

(10) Patent No.: US 9,659,680 B2
(45) Date of Patent: *May 23, 2017

(54) COMPOSITE CORE FOR ELECTRICAL TRANSMISSION CABLES

(71) Applicant: Ticona LLC, Florence, KY (US)

(72) Inventors: Sherri M. Nelson, St. Croix, MN (US);
David W. Eastep, Winona, MN (US);
Timothy L. Tibor, Winona, MN (US);
Timothy A. Regan, Winona, MN (US);
Michael L. Wesley, Dover, MN (US);
Richard Steihm, Winona, MN (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,769

(22) Filed: Oct. 15, 2015

(65) Prior Publication Data
US 2016/0035453 A1     Feb. 4, 2016

Related U.S. Application Data

(63) Continuation of application No. 14/005,829, filed as application No. PCT/US2012/033034 on Apr. 11, 2012, now Pat. No. 9,190,184.
(Continued)

(51) Int. Cl.
*H01B 5/00* (2006.01)
*H01B 1/04* (2006.01)
(Continued)

(52) U.S. Cl.
CPC ............. *H01B 1/04* (2013.01); *B29B 15/122* (2013.01); *B29C 70/523* (2013.01); *H01B 1/023* (2013.01);
(Continued)

(58) Field of Classification Search
CPC ....... A63B 69/00; B29B 15/122; B29C 65/00; B29C 33/30; B29C 33/40; B29C 33/307;
(Continued)

(56) References Cited

U.S. PATENT DOCUMENTS 2,997,529 A    8/1961  Fink
3,538,700 A    11/1970 Hofer
(Continued)

FOREIGN PATENT DOCUMENTS

CN    2071207    2/1991
CN    1220330    6/1999
(Continued)

OTHER PUBLICATIONS

ROC (Taiwan) Patent Application No. 101112845 dated Oct. 16, 2015, 1 page.

*Primary Examiner* — Timothy Thompson
*Assistant Examiner* — Guillermo Egoavil
(74) *Attorney, Agent, or Firm* — Dority & Manning, P.A.

(57) ABSTRACT

A composite core for use in electrical cables, such as high voltage transmission cables is provided. The composite core contains at least one rod that includes a continuous fiber component surrounded by a capping layer. The continuous fiber component is formed from a plurality of unidirectionally aligned fiber rovings embedded within a thermoplastic polymer matrix. The present inventors have discovered that the degree to which the rovings are impregnated with the thermoplastic polymer matrix can be significantly improved through selective control over the impregnation process, and also through control over the degree of compression imparted to the rovings during formation and shaping of the rod, as well as the calibration of the final rod geometry. Such a well impregnated rod has a very small void fraction, which leads to excellent strength properties. Notably, the desired (Continued)

strength properties may be achieved without the need for different fiber types in the rod.

40 Claims, 10 Drawing Sheets

Related U.S. Application Data

(60) Provisional application No. 61/474,458, filed on Apr. 12, 2011.

(51) Int. Cl.
| | | |
|---|---|---|
| B29C 70/52 | (2006.01) | |
| H01B 5/10 | (2006.01) | |
| H01B 1/02 | (2006.01) | |
| H01R 43/00 | (2006.01) | |
| B29B 15/12 | (2006.01) | |
| H01B 9/00 | (2006.01) | |
| H01B 9/04 | (2006.01) | |
| H01B 7/18 | (2006.01) | |
| H01B 13/00 | (2006.01) | |
| H01B 7/29 | (2006.01) | |
| H01B 13/30 | (2006.01) | |

(52) U.S. Cl.
CPC ............ *H01B 1/026* (2013.01); *H01B 5/105* (2013.01); *H01B 7/18* (2013.01); *H01B 7/292* (2013.01); *H01B 9/008* (2013.01); *H01B 9/04* (2013.01); *H01B 13/0036* (2013.01); *H01B 13/30* (2013.01); *H01R 43/00* (2013.01); *Y10T 29/49117* (2015.01)

(58) Field of Classification Search
CPC ....... B29C 51/365; B29C 70/38; B29C 70/08; B29C 70/32; B29C 70/46; B29C 70/52; B29C 70/386; B29C 70/467; B29C 70/521; B29C 70/523; B32B 5/24; B32B 5/26; B32B 5/28; B32B 27/04; B32B 27/08; B32B 27/12; B32B 27/18; B32B 27/38; B32B 3/12; B32B 5/022; B63H 9/0657; C08G 59/3227; C08G 59/3236; C08J 5/048; C08J 5/24; C08L 63/00; D07B 1/025; D07B 1/0673; D07B 1/02; D07B 1/04; D07B 1/145; D07B 1/162; D07B 2801/10; D07B 2205/3007; D07B 5/06; D07B 1/16; D01F 9/12; H01B 1/04; H01B 1/023; H01B 1/026; H01B 5/105; H01B 5/10; H01B 7/14; H01B 7/1825; H01B 9/00; H01B 9/04; H01B 9/005; H01B 9/006; H01B 9/008; H01B 11/22; H01B 13/0036; H01R 43/00; H02G 3/00; H02G 7/04; H02G 7/056; H02G 15/06; H02G 15/18; F16C 1/20; F16L 59/14; F16L 9/18; F16L 9/19; Y10T 428/2933; Y10T 429/49117; B29D 99/0046
USPC ........ 156/157; 174/126.2, 102 R, 106 R, 47, 174/126.1; 264/136, 257; 428/34.5, 221, 428/375, 297.4, 304.4, 364; 442/370
See application file for complete search history.

(56) References Cited

U.S. PATENT DOCUMENTS

| | | |
|---|---|---|
| 3,742,106 A | 6/1973 | Price |
| 3,858,616 A | 1/1975 | Thiery et al. |
| 4,013,100 A | 3/1977 | Thiery et al. |
| 4,023,799 A | 5/1977 | Van Auken |
| 4,058,581 A | 11/1977 | Park |
| 4,194,873 A | 3/1980 | Killmeyer |
| 4,196,307 A | 4/1980 | Moore |
| 4,227,037 A | 10/1980 | Layton |
| 4,229,397 A | 10/1980 | Fukuta et al. |
| 4,307,979 A | 12/1981 | Killmeyer |
| 4,443,507 A | 4/1984 | Yamada |
| 4,504,338 A | 3/1985 | Ives |
| 4,532,169 A | 7/1985 | Carley |
| 4,541,884 A | 9/1985 | Cogswell et al. |
| 4,549,920 A | 10/1985 | Cogswell et al. |
| 4,613,393 A | 9/1986 | Cattanach et al. |
| 4,614,678 A | 9/1986 | Ganga |
| 4,640,861 A | 2/1987 | Binnersley et al. |
| 4,680,224 A | 7/1987 | O'Connor |
| 4,692,291 A | 9/1987 | Angell, Jr. |
| 4,713,283 A | 12/1987 | Cogswell et al. |
| 4,749,422 A | 6/1988 | Kondo et al. |
| 4,770,838 A | 9/1988 | Cattanach et al. |
| 4,778,637 A | 10/1988 | Adams et al. |
| 4,792,481 A | 12/1988 | O'Connor et al. |
| 4,800,113 A | 1/1989 | O'Connor |
| 4,871,491 A | 10/1989 | McMahon et al. |
| 4,876,055 A | 10/1989 | Cattanach |
| 4,892,772 A | 1/1990 | Su |
| 4,902,453 A | 2/1990 | Okura et al. |
| 4,904,436 A | 2/1990 | Rachal |
| 4,907,855 A | 3/1990 | Oestreich |
| 4,923,134 A | 5/1990 | Kinnan |
| 4,937,032 A | 6/1990 | Krone et al. |
| 4,992,229 A | 2/1991 | Beever |
| 4,997,693 A | 3/1991 | Sonoh et al. |
| 5,001,184 A | 3/1991 | Barnes et al. |
| 5,017,643 A | 5/1991 | Snelling et al. |
| 5,018,583 A | 5/1991 | Williams |
| 5,037,599 A | 8/1991 | Olson |
| 5,039,572 A | 8/1991 | Bobsein et al. |
| 5,045,377 A | 9/1991 | Amata |
| 5,066,536 A | 11/1991 | Cogswell et al. |
| 5,080,175 A | 1/1992 | Williams |
| 5,082,701 A | 1/1992 | Craven et al. |
| 5,085,928 A | 2/1992 | Krueger |
| 5,087,657 A | 2/1992 | Qureshi et al. |
| 5,089,326 A | 2/1992 | Bonazza |
| 5,097,870 A | 3/1992 | Williams |
| 5,108,780 A | 4/1992 | Pitt et al. |
| 5,126,167 A | 6/1992 | Matsuno et al. |
| 5,130,193 A | 7/1992 | Ikeda |
| 5,137,766 A | 8/1992 | Mazanek et al. |
| 5,145,626 A | 9/1992 | Bastioli et al. |
| 5,149,581 A | 9/1992 | Matsuo et al. |
| 5,149,749 A | 9/1992 | Blackwell et al. |
| 5,172,765 A | 12/1992 | Sas-Jaworsky |
| 5,176,180 A | 1/1993 | Williams |
| 5,176,775 A | 1/1993 | Montsinger |
| 5,181,930 A | 1/1993 | Dumbleton et al. |
| 5,187,009 A | 2/1993 | Kimura et al. |
| 5,192,330 A | 3/1993 | Chang et al. |
| 5,207,850 A | 5/1993 | Parekh |
| 5,209,136 A | 5/1993 | Williams |
| 5,209,888 A | 5/1993 | Shimada et al. |
| 5,210,128 A | 5/1993 | Johnson |
| 5,231,249 A | 7/1993 | Kimura et al. |
| 5,234,058 A | 8/1993 | Sas-Jaworsky |
| 5,246,520 A | 9/1993 | Scanlon et al. |
| 5,282,673 A | 2/1994 | Koyama et al. |
| 5,285,008 A | 2/1994 | Sas-Jaworsky |
| 5,286,553 A | 2/1994 | Haraguchi et al. |
| 5,286,561 A | 2/1994 | Johnson et al. |
| 5,298,318 A | 3/1994 | Soules et al. |
| 5,316,834 A | 5/1994 | Matsuda et al. |
| 5,319,003 A | 6/1994 | Gomez et al. |
| 5,324,563 A | 6/1994 | Rogers et al. |
| 5,348,084 A | 9/1994 | Fay |
| 5,361,483 A | 11/1994 | Rainville et al. |
| 5,362,545 A | 11/1994 | Tingley |
| 5,362,921 A | 11/1994 | Birkelund et al. |
| 5,364,657 A | 11/1994 | Throne |
| 5,370,911 A | 12/1994 | Throne et al. |

(56) References Cited

U.S. PATENT DOCUMENTS

| | | |
|---|---|---|
| 5,374,694 A | 12/1994 | MacKenzie et al. |
| 5,424,338 A | 6/1995 | Chen et al. |
| 5,429,066 A | 7/1995 | Lewit et al. |
| 5,439,632 A | 8/1995 | Leach et al. |
| 5,439,635 A | 8/1995 | Seemann |
| 5,454,693 A | 10/1995 | Aubry et al. |
| 5,462,408 A | 10/1995 | Coffy |
| 5,462,618 A | 10/1995 | Rogers et al. |
| 5,468,327 A | 11/1995 | Pawlowicz et al. |
| 5,525,003 A | 6/1996 | Williams et al. |
| 5,529,652 A | 6/1996 | Asai et al. |
| 5,542,230 A | 8/1996 | Schutze |
| 5,614,139 A | 3/1997 | Cutolo et al. |
| 5,650,220 A | 7/1997 | Greenwood |
| 5,700,417 A | 12/1997 | Fernyhough et al. |
| 5,702,628 A | 12/1997 | Nemoto |
| 5,705,241 A | 1/1998 | Schutze |
| 5,717,263 A | 2/1998 | Cox |
| 5,725,954 A | 3/1998 | Montsinger |
| 5,727,357 A | 3/1998 | Arumugasaamy et al. |
| 5,741,382 A | 4/1998 | Ma et al. |
| 5,769,160 A | 6/1998 | Owens |
| 5,776,607 A | 7/1998 | McCullough |
| 5,783,129 A | 7/1998 | Shirai et al. |
| 5,788,908 A | 8/1998 | Murakami |
| 5,792,527 A | 8/1998 | Yoshimitsu et al. |
| 5,813,106 A | 9/1998 | Haug et al. |
| 5,840,424 A | 11/1998 | McGrail et al. |
| 5,858,493 A | 1/1999 | Sandt |
| 5,866,051 A | 2/1999 | Lin et al. |
| 5,888,609 A | 3/1999 | Karttunen et al. |
| 5,892,874 A | 4/1999 | Houghton |
| 5,895,808 A | 4/1999 | Schmid et al. |
| 5,902,958 A | 5/1999 | Haxton |
| 5,908,049 A | 6/1999 | Williams |
| 5,913,003 A | 6/1999 | Arroyo |
| 5,913,337 A | 6/1999 | Williams |
| 5,921,285 A | 7/1999 | Quigley et al. |
| 5,935,508 A | 8/1999 | Fernyhough et al. |
| 5,972,503 A | 10/1999 | Woodside |
| 5,972,810 A | 10/1999 | Gabrisch et al. |
| 5,989,710 A | 11/1999 | Matsuo et al. |
| 6,004,650 A | 12/1999 | Schweizer et al. |
| 6,027,786 A | 2/2000 | Ford |
| 6,042,765 A | 3/2000 | Sugahara et al. |
| 6,046,404 A | 4/2000 | Figenschou |
| 6,048,598 A | 4/2000 | Bryan, III et al. |
| 6,074,716 A | 6/2000 | Tsotsis |
| 6,090,319 A | 7/2000 | Sharma et al. |
| 6,106,650 A | 8/2000 | Cheshire |
| 6,117,551 A | 9/2000 | Nagata et al. |
| 6,146,052 A | 11/2000 | Jacobsen |
| 6,179,942 B1 | 1/2001 | Padmanabhan |
| 6,221,798 B1 | 4/2001 | Mahale et al. |
| 6,244,014 B1 | 6/2001 | Barmakian |
| 6,248,262 B1 | 6/2001 | Kubotera et al. |
| 6,249,628 B1 | 6/2001 | Rutterman et al. |
| 6,251,206 B1 | 6/2001 | Saito et al. |
| 6,258,453 B1 | 7/2001 | Montsinger |
| 6,260,343 B1 | 7/2001 | Pourladian |
| 6,265,333 B1 | 7/2001 | Dzenis et al. |
| 6,270,851 B1 | 8/2001 | Lee et al. |
| 6,283,206 B1 | 9/2001 | Fraser |
| 6,299,246 B1 | 10/2001 | Tomka |
| 6,322,893 B1 | 11/2001 | Gauchel et al. |
| 6,329,056 B1 | 12/2001 | Deve et al. |
| 6,334,293 B1 | 1/2002 | Poethke et al. |
| 6,344,270 B1 | 2/2002 | McCullough et al. |
| 6,346,325 B1 | 2/2002 | Edwards et al. |
| 6,355,133 B1 | 3/2002 | Williams |
| 6,355,879 B1 | 3/2002 | Bertini |
| 6,365,257 B1 | 4/2002 | Hecht |
| 6,391,456 B1 | 5/2002 | Krishnaswamy et al. |
| 6,391,959 B1 | 5/2002 | Ninomiya et al. |
| 6,417,457 B1 | 7/2002 | Aasbo et al. |
| 6,455,143 B1 | 9/2002 | Ishibashi et al. |
| 6,472,614 B1 | 10/2002 | Dupont et al. |
| 6,485,796 B1 | 11/2002 | Carpenter et al. |
| 6,538,198 B1 | 3/2003 | Wooters |
| 6,567,591 B2 | 5/2003 | Hoch |
| 6,596,373 B1 | 7/2003 | Kishi et al. |
| 6,612,370 B1 | 9/2003 | Jahnsen |
| 6,620,471 B1 | 9/2003 | Do |
| 6,630,221 B1 | 10/2003 | Wong |
| 6,647,187 B2 | 11/2003 | Consonni et al. |
| 6,656,316 B1 | 12/2003 | Dyksterhouse |
| 6,658,836 B2 | 12/2003 | Nguyen et al. |
| 6,676,870 B1 | 1/2004 | Hattori et al. |
| 6,714,709 B1 | 3/2004 | Birkeland et al. |
| 6,715,191 B2 | 4/2004 | Adzima et al. |
| 6,740,381 B2 | 5/2004 | Day et al. |
| 6,743,742 B1 | 6/2004 | LaRocco et al. |
| 6,773,773 B2 | 8/2004 | Hauber |
| 6,808,796 B1 | 10/2004 | Miyao et al. |
| 6,821,613 B1 | 11/2004 | Kägi et al. |
| 6,846,857 B1 | 1/2005 | Lindner |
| 6,872,343 B2 | 3/2005 | Edwards et al. |
| 6,919,115 B2 | 7/2005 | Foster |
| 6,940,054 B1 | 9/2005 | Heggdal |
| 6,943,300 B2 | 9/2005 | Ekeberg |
| 7,011,774 B2 | 3/2006 | Risch |
| 7,015,395 B2 | 3/2006 | Goldsworthy et al. |
| 7,041,194 B1 | 5/2006 | Meuller et al. |
| 7,049,025 B2 | 5/2006 | Cooper et al. |
| 7,059,091 B2 | 6/2006 | Paulshus et al. |
| 7,060,326 B2 | 6/2006 | Hiel et al. |
| 7,093,416 B2 | 8/2006 | Johnson et al. |
| 7,131,308 B2 | 11/2006 | McCullough et al. |
| 7,138,345 B2 | 11/2006 | Wadahara et al. |
| 7,158,703 B2 | 1/2007 | Mjelstad |
| 7,170,007 B2 | 1/2007 | Varkey et al. |
| 7,179,517 B2 | 2/2007 | Jones et al. |
| 7,179,522 B2 | 2/2007 | Hiel et al. |
| 7,188,406 B2 | 3/2007 | Varkey et al. |
| 7,211,319 B2 | 5/2007 | Hiel et al |
| 7,220,492 B2 | 5/2007 | Fick et al. |
| 7,235,742 B2 | 6/2007 | Aochi et al. |
| 7,239,781 B2 | 7/2007 | Chartier |
| 7,275,734 B2 | 10/2007 | Bland et al. |
| 7,282,638 B2 | 10/2007 | Karlsen |
| 7,285,726 B2 | 10/2007 | Bremnes |
| 7,291,263 B2 | 11/2007 | Ward et al. |
| 7,326,854 B2 | 2/2008 | Varkey |
| 7,368,162 B2 | 5/2008 | Hiel et al. |
| 7,381,990 B2 | 6/2008 | Bremnes |
| 7,402,753 B2 | 7/2008 | Varkey et al. |
| 7,438,971 B2 | 10/2008 | Bryant et al. |
| 7,473,844 B2 | 1/2009 | Figenschou |
| 7,485,811 B2 | 2/2009 | Mjelstad |
| 7,555,181 B2 | 6/2009 | Temple et al. |
| 7,586,042 B2 | 9/2009 | Varkey et al. |
| 7,629,535 B2 | 12/2009 | Espen |
| 7,643,713 B2 | 1/2010 | Büthe |
| 7,650,742 B2 | 1/2010 | Ushijima |
| 7,683,262 B2 | 3/2010 | Guery et al. |
| 7,705,242 B2 | 4/2010 | Winterhalter |
| 7,754,966 B2 | 7/2010 | Figenschou |
| 7,798,234 B2 | 9/2010 | Ju et al. |
| 8,859,089 B2 | 10/2014 | Nelson et al. |
| 9,093,191 B2 | 7/2015 | Hiel et al. |
| 2002/0019182 A1 | 2/2002 | Ishibashi et al. |
| 2002/0041049 A1 | 4/2002 | McCullough |
| 2002/0125603 A1 | 9/2002 | Sakai et al. |
| 2002/0180095 A1 | 12/2002 | Berard |
| 2003/0037529 A1 | 2/2003 | Hanna et al. |
| 2003/0044593 A1 | 3/2003 | Vaidyanathan et al. |
| 2003/0082380 A1 | 5/2003 | Hager et al. |
| 2003/0096898 A1 | 5/2003 | Bernd et al. |
| 2003/0104191 A1 | 6/2003 | Yokoo et al. |
| 2003/0121594 A1 | 7/2003 | Brill |
| 2003/0148085 A1 | 8/2003 | Edwards |
| 2003/0168164 A1 | 9/2003 | Blackmore et al. |
| 2003/0175489 A1 | 9/2003 | Dolby |
| 2004/0062915 A1 | 4/2004 | Pabedinskas et al. |

(56) References Cited

U.S. PATENT DOCUMENTS

| | | |
|---|---|---|
| 2004/0081816 A1 | 4/2004 | Pyzik et al. |
| 2004/0098963 A1 | 5/2004 | Calleeuw et al. |
| 2004/0102115 A1 | 5/2004 | Chou |
| 2004/0142143 A1 | 7/2004 | Corden et al. |
| 2004/0146696 A1 | 7/2004 | Jones |
| 2004/0170554 A1 | 9/2004 | Wadahara et al. |
| 2004/0182597 A1 | 9/2004 | Smith et al. |
| 2004/0224590 A1 | 11/2004 | Rawa et al. |
| 2004/0241415 A1 | 12/2004 | Wadahara et al. |
| 2004/0265558 A1 | 12/2004 | Berard |
| 2005/0116403 A1 | 6/2005 | Wellman |
| 2005/0123374 A1 | 6/2005 | Thorning |
| 2005/0150593 A1 | 7/2005 | Honma et al. |
| 2005/0178000 A1 | 8/2005 | McCullough et al. |
| 2005/0181228 A1 | 8/2005 | McCullough et al. |
| 2005/0186410 A1 | 8/2005 | Bryant et al. |
| 2005/0236093 A1 | 10/2005 | Taggart |
| 2005/0244231 A1 | 11/2005 | Liao et al. |
| 2005/0252379 A1 | 11/2005 | Von Blucher |
| 2006/0013979 A1 | 1/2006 | Ensinger |
| 2006/0021729 A1 | 2/2006 | Werner et al. |
| 2006/0024489 A1 | 2/2006 | Werner et al. |
| 2006/0024490 A1 | 2/2006 | Werner et al. |
| 2006/0027314 A1 | 2/2006 | Jones et al. |
| 2006/0049541 A1 | 3/2006 | Sutton et al. |
| 2006/0141232 A1 | 6/2006 | Ma |
| 2006/0144456 A1 | 7/2006 | Donnison |
| 2006/0165955 A1 | 7/2006 | Ruegg et al. |
| 2006/0204739 A1 | 9/2006 | Papke et al. |
| 2006/0252334 A1 | 11/2006 | LoFaro et al. |
| 2006/0288568 A1 | 12/2006 | Clouet et al. |
| 2007/0090162 A1 | 4/2007 | Verhaeghe |
| 2007/0128435 A1 | 6/2007 | Hiel et al. |
| 2007/0154710 A1 | 7/2007 | Bradley |
| 2007/0175571 A1 | 8/2007 | Rubin et al. |
| 2007/0193767 A1 | 8/2007 | Guery et al. |
| 2007/0202331 A1 | 8/2007 | Davis et al. |
| 2007/0205009 A1 | 9/2007 | Figenschou |
| 2007/0251694 A1 | 11/2007 | Ju |
| 2007/0253778 A1 | 11/2007 | Figenschou |
| 2007/0269645 A1 | 11/2007 | Raghavendran et al. |
| 2007/0271897 A1 | 11/2007 | Hanna et al. |
| 2007/0289234 A1 | 12/2007 | Carlson et al. |
| 2008/0006337 A1 | 1/2008 | Quigley et al. |
| 2008/0028740 A1 | 2/2008 | Ushijima |
| 2008/0141614 A1 | 6/2008 | Knouff et al. |
| 2008/0250631 A1 | 10/2008 | Buckley |
| 2008/0282664 A1 | 11/2008 | Chou et al. |
| 2008/0282666 A1 | 11/2008 | Chou |
| 2009/0120632 A1 | 5/2009 | Worman et al. |
| 2009/0229452 A1 | 9/2009 | Milwich et al. |
| 2010/0012342 A1 | 1/2010 | Figenschou |
| 2010/0038112 A1 | 2/2010 | Grether |
| 2010/0054677 A1 | 3/2010 | Figenschou |
| 2010/0136278 A1 | 6/2010 | Cadd et al. |
| 2010/0143145 A1 | 6/2010 | Jones |
| 2010/0163275 A1 | 7/2010 | Hiel et al. |
| 2010/0166998 A1 | 7/2010 | Bannister et al. |
| 2010/0181012 A1 | 7/2010 | Hiel et al. |
| 2010/0206606 A1 | 8/2010 | Winterhalter |
| 2010/0243289 A1 | 9/2010 | Figenschou |
| 2010/0261000 A1 | 10/2010 | Jones |
| 2010/0291370 A1 | 11/2010 | Jones |
| 2012/0261158 A1* | 10/2012 | Daniel .................. B29C 70/523 174/102 A |
| 2012/0263539 A1 | 10/2012 | Figenschou |
| 2014/0005331 A1* | 1/2014 | Johnson .................. C08K 3/04 524/592 |
| 2015/0194238 A1* | 7/2015 | Daniel .................. B29C 70/523 174/128.1 |

FOREIGN PATENT DOCUMENTS

| | | |
|---|---|---|
| CN | 2637534 | 9/2004 |
| EP | 0177475 | 4/1986 |
| EP | 1099538 | 5/2001 |
| EP | 1128958 | 8/2005 |
| EP | 1438169 | 6/2006 |
| EP | 1724306 | 11/2006 |
| EP | 1469484 | 6/2007 |
| FR | 2836591 | 8/2003 |
| GB | 2240997 | 8/1991 |
| JP | H03-119188 | 5/1991 |
| JP | H05-033278 | 2/1993 |
| JP | H05-148780 | 6/1993 |
| JP | H07-279940 | 10/1995 |
| JP | 2004/300609 | 10/2004 |
| WO | WO 2005/033393 | 4/2005 |
| WO | WO 2008/111847 | 9/2008 |
| WO | WO 2009/092989 | 7/2009 |
| WO | WO 2009/118536 | 10/2009 |
| WO | WO 2009/130525 | 10/2009 |
| WO | WO 2010/066692 | 6/2010 |
| WO | WO 2011/163349 | 12/2011 |
| WO | WO 2011/163357 | 12/2011 |

* cited by examiner

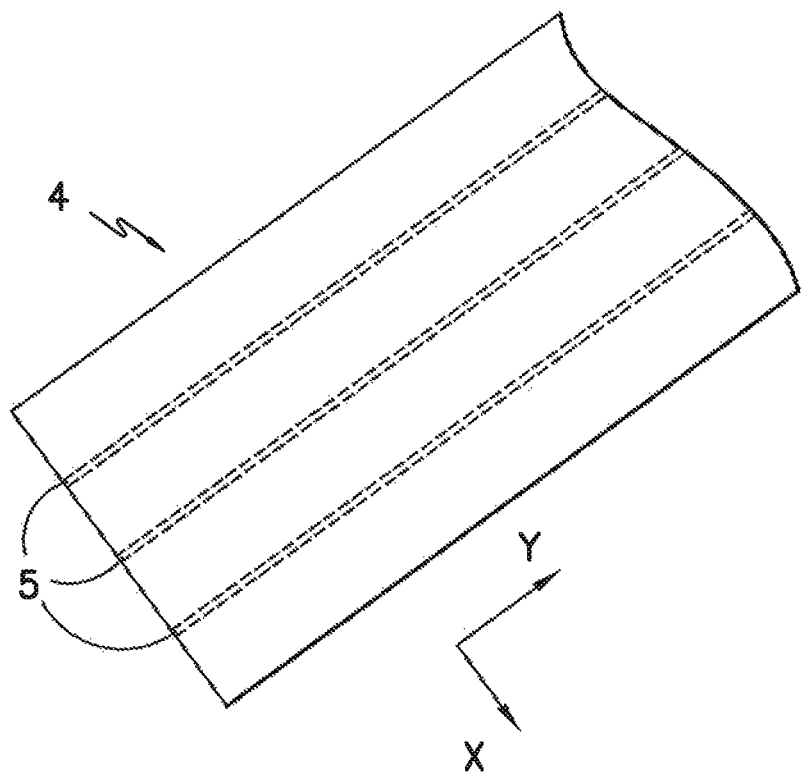
FIG. —1—
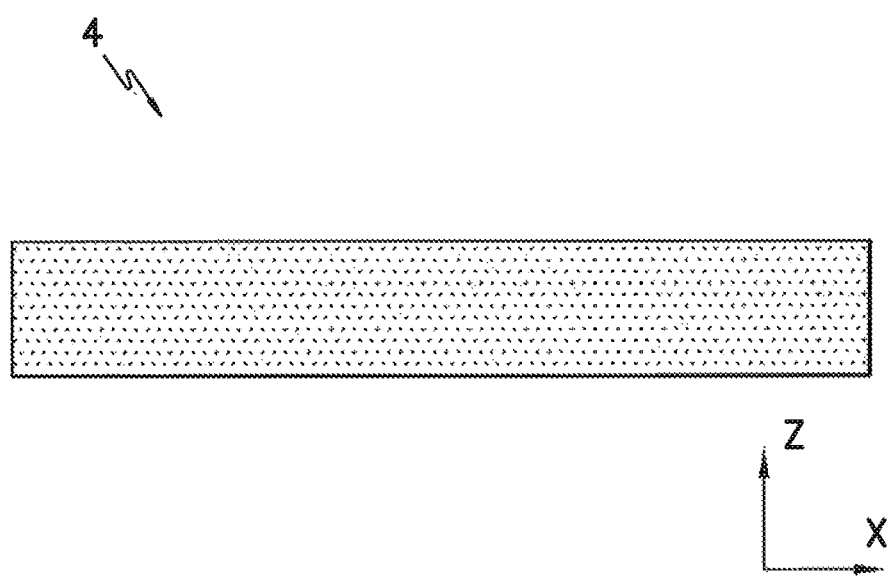
FIG. —2—

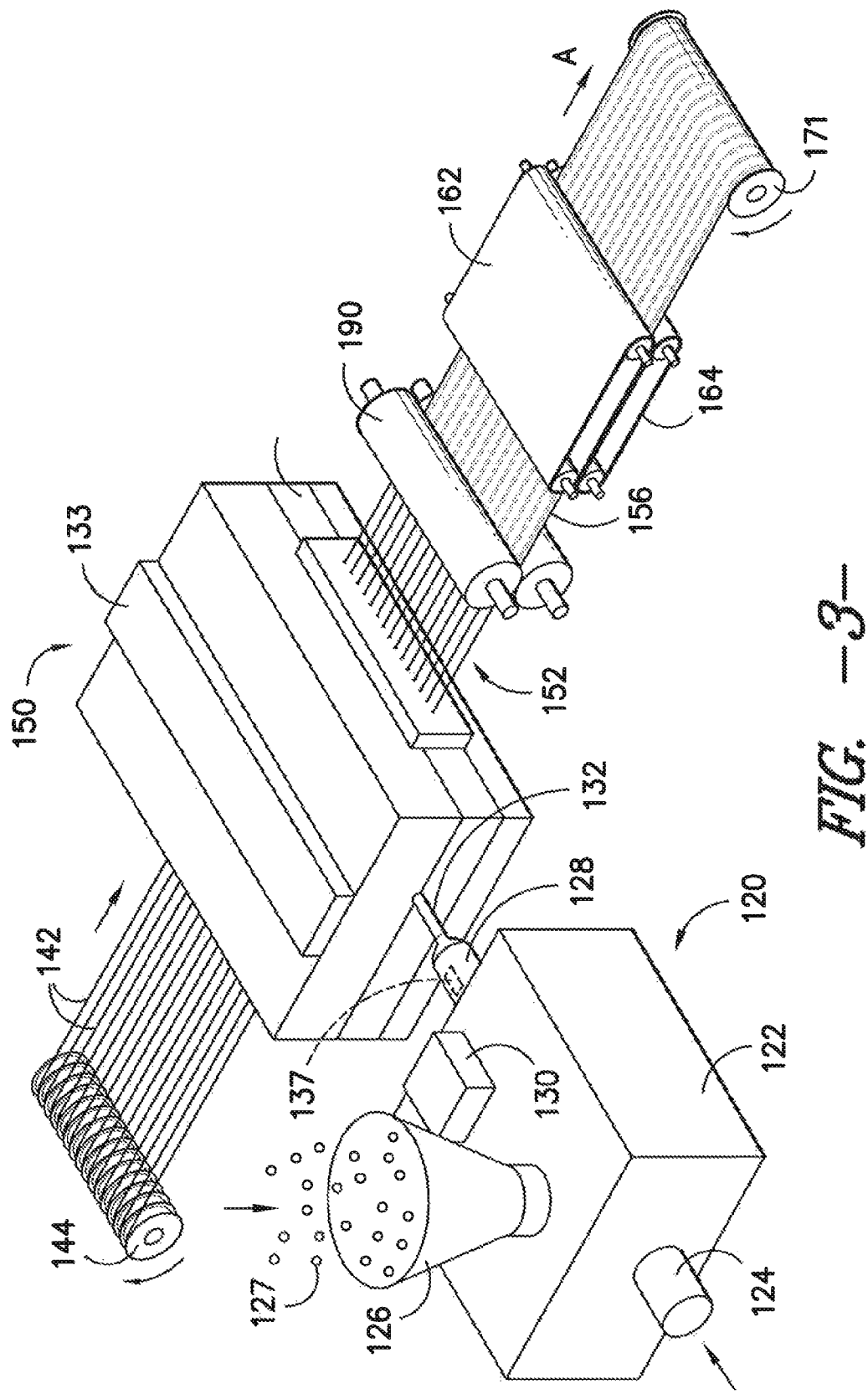
FIG. -3-

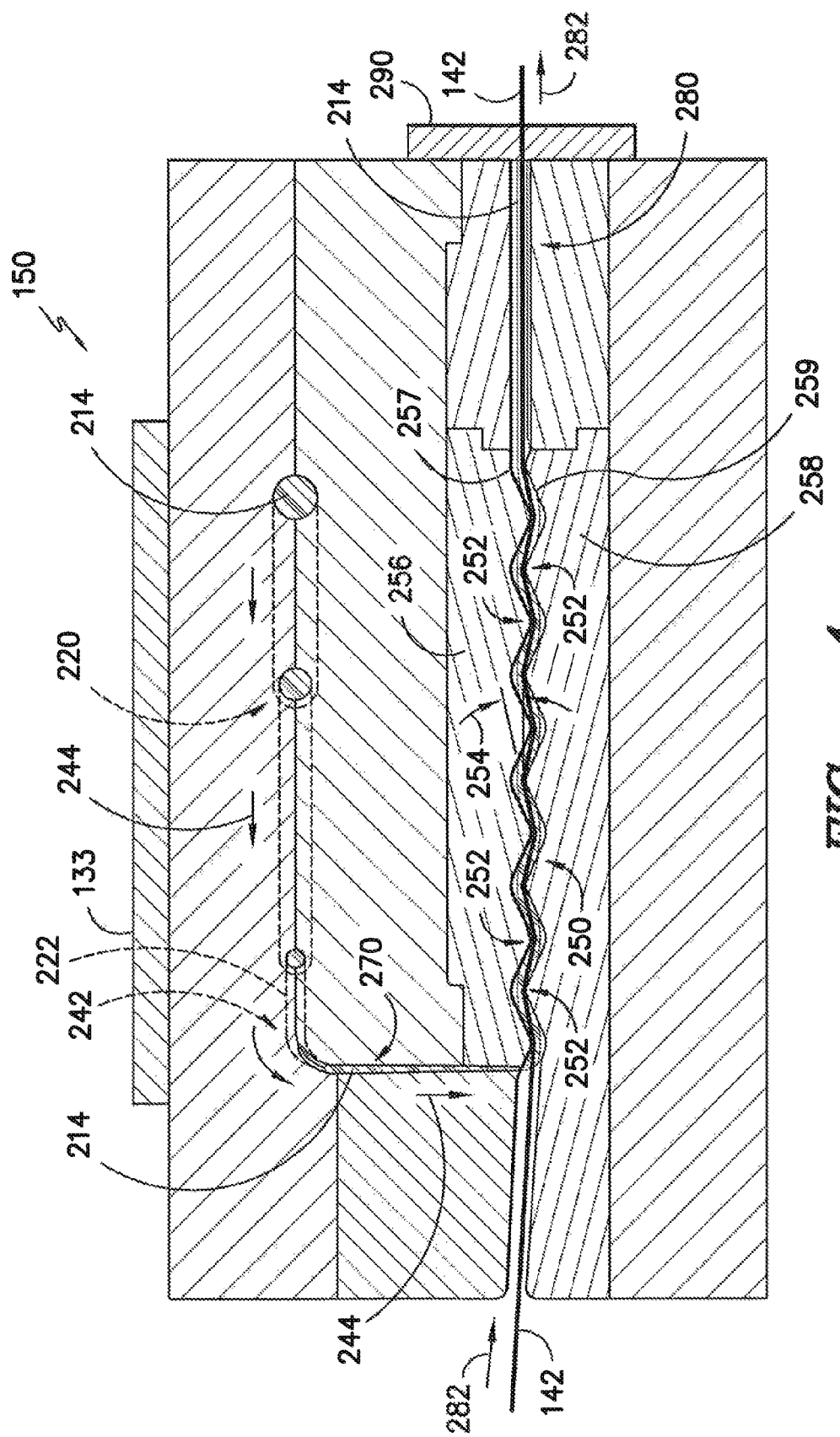

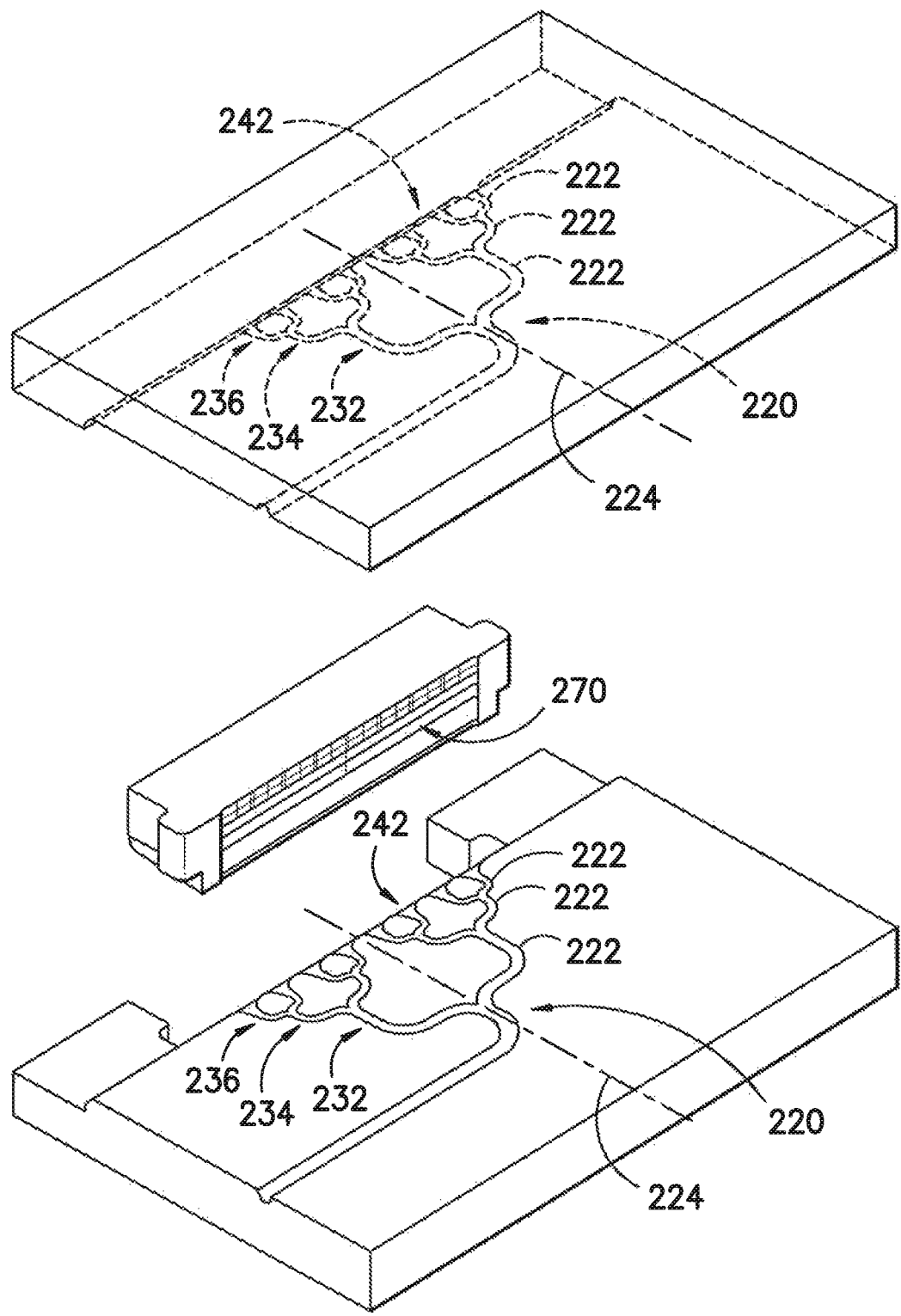
FIG. -5-

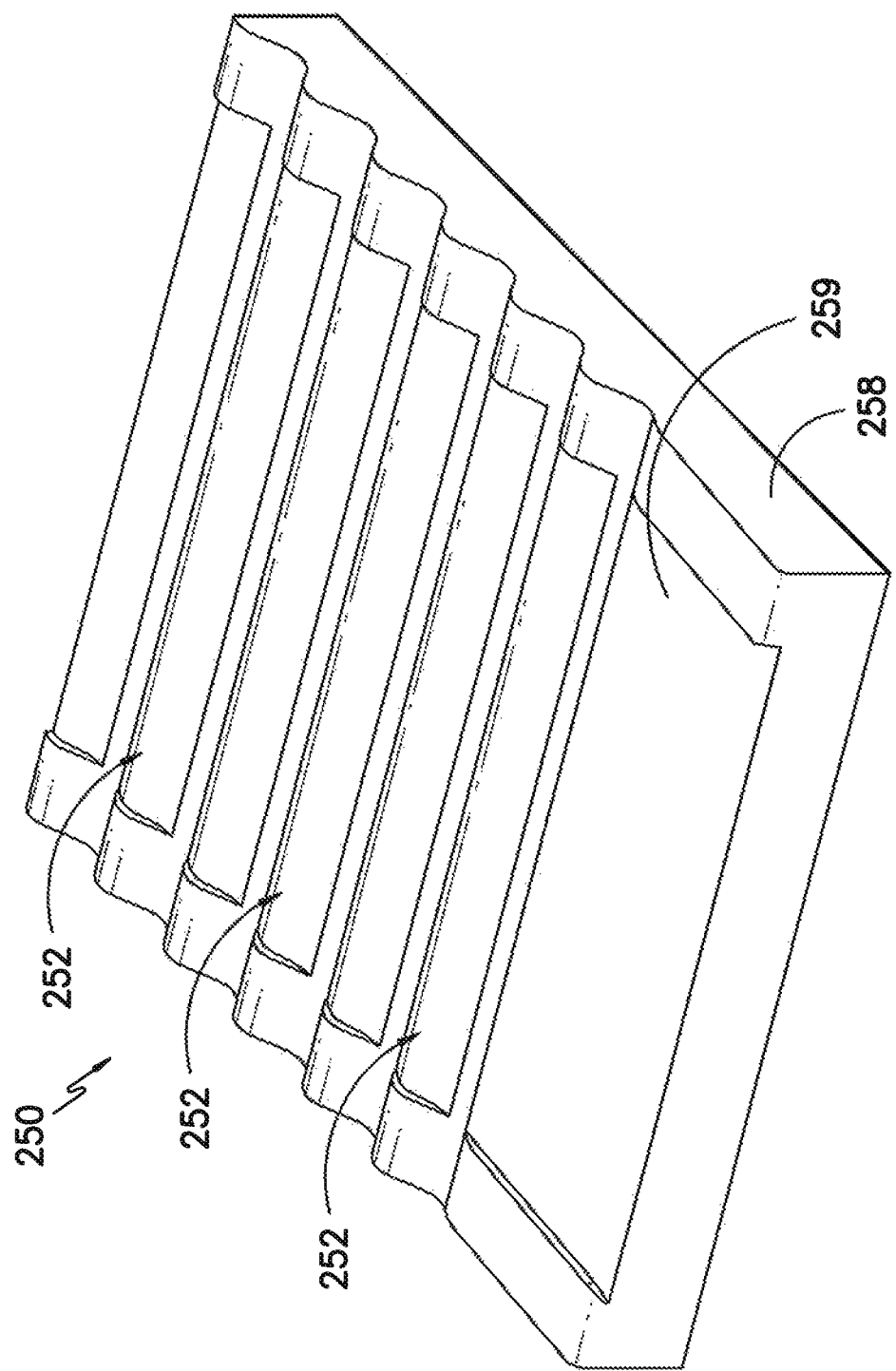
FIG. -6-

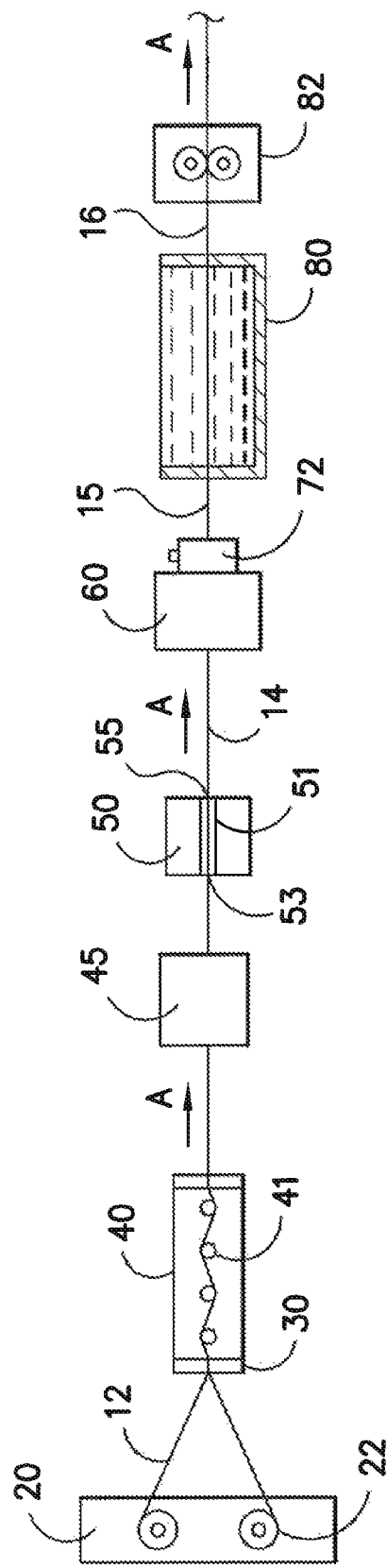
FIG. -7-

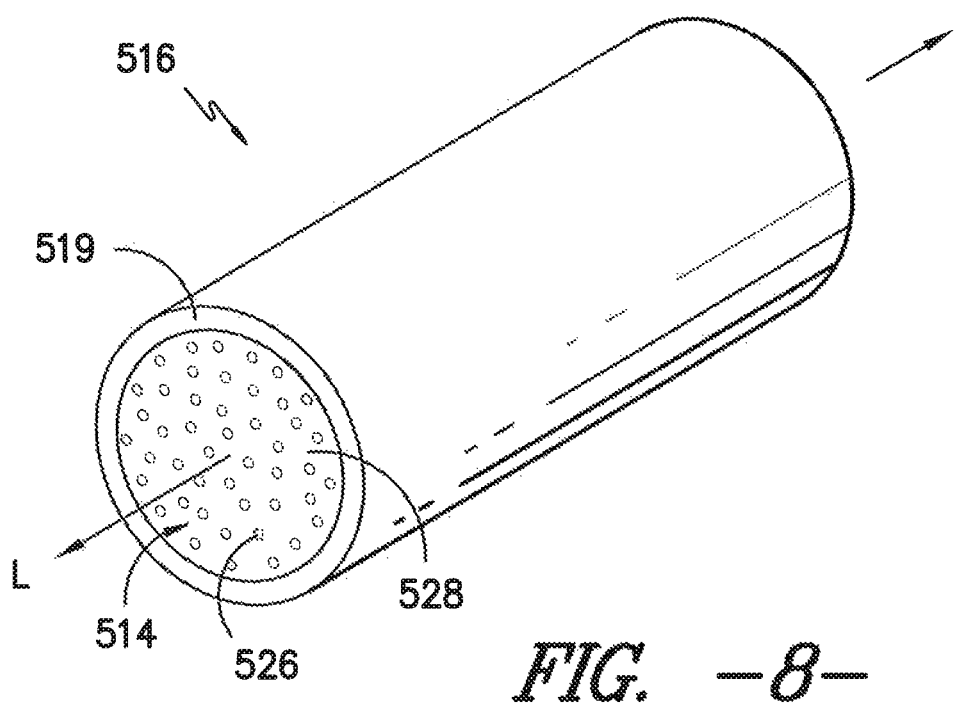
FIG. -8-
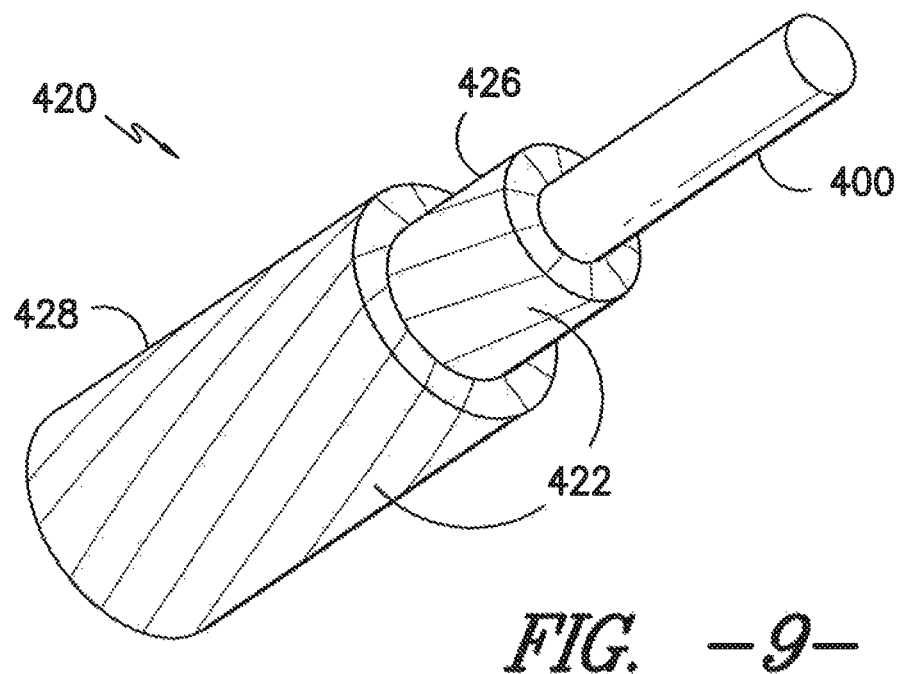
FIG. -9-

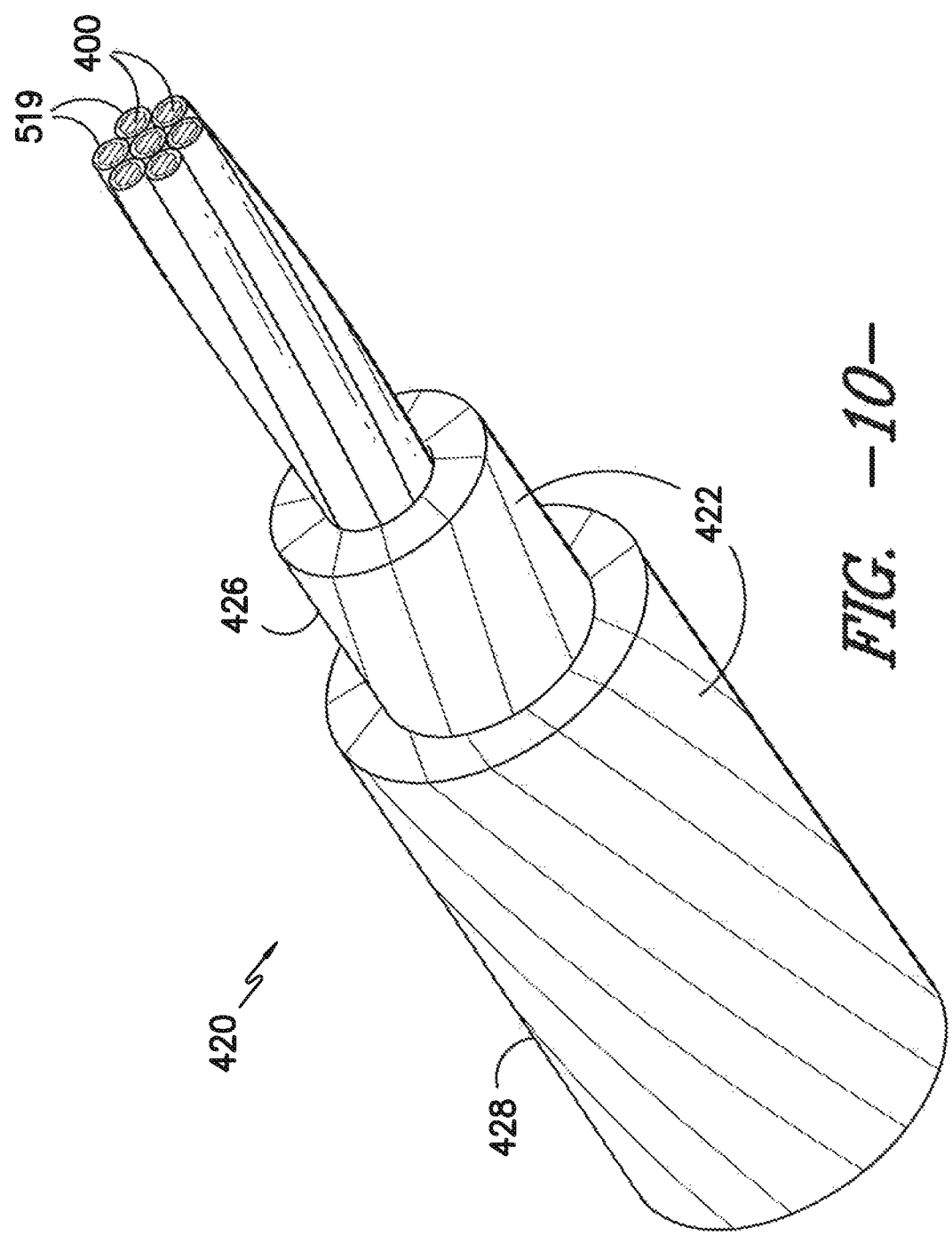

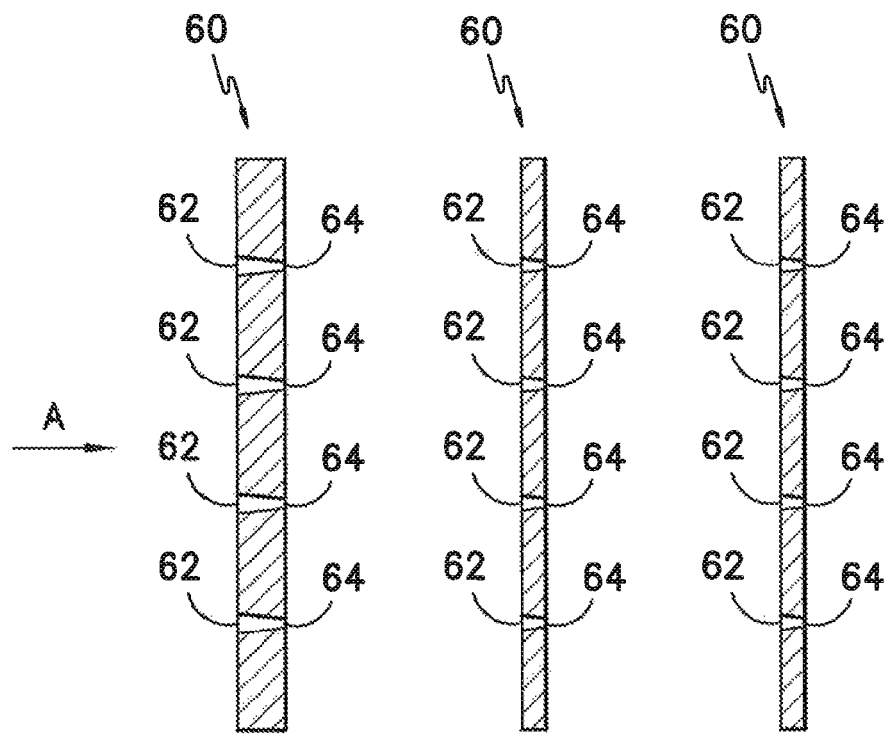
FIG. -11-
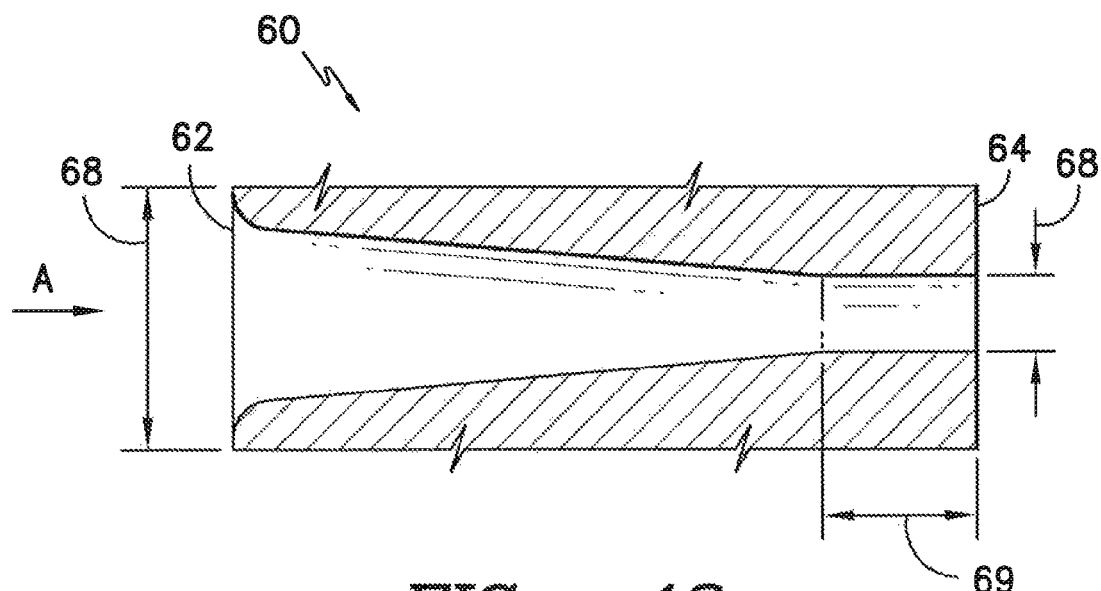
FIG. -12-

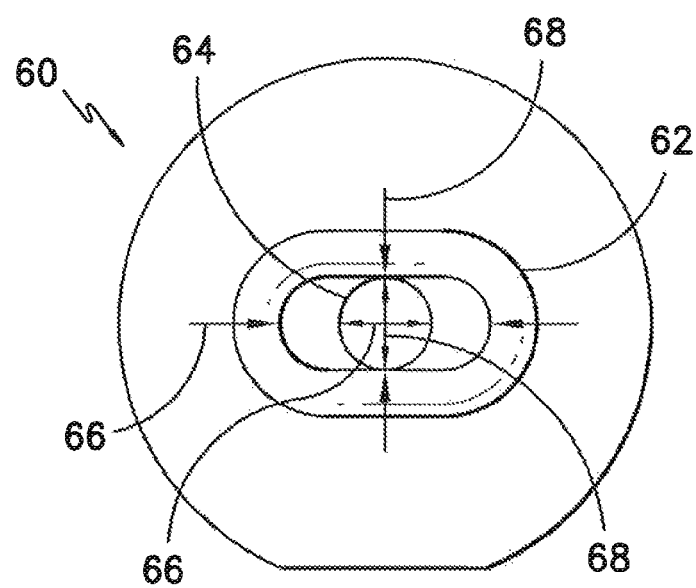
FIG. -13-
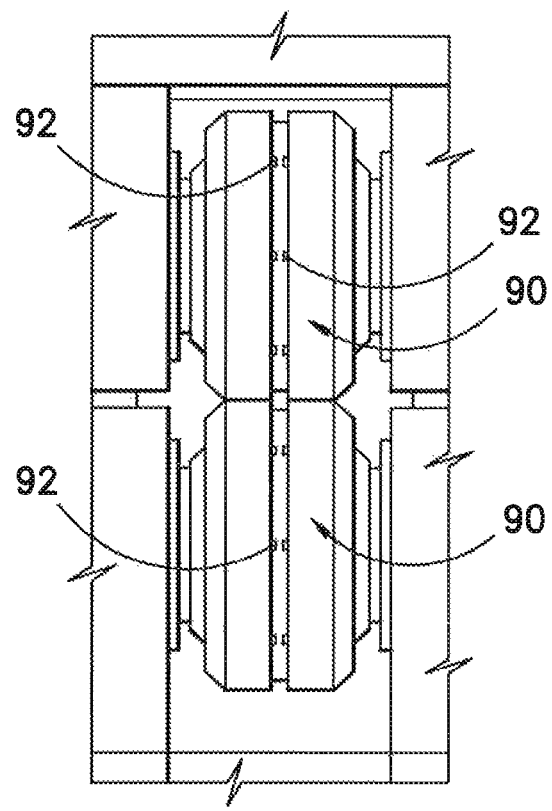
FIG. -14-

COMPOSITE CORE FOR ELECTRICAL TRANSMISSION CABLES

CROSS REFERENCE TO RELATED APPLICATION

This application claims priority as a continuation application of U.S. Ser. No. 14/005,829, filed Sep. 18, 2013, titled: "COMPOSITE CORE FOR ELECTRICAL TRANSMISSION CABLES", which is a U.S. National Stage filing of International Patent Application No. PCT/US2012/033034 filed Apr. 11, 2012, titled: "COMPOSITE CORE FOR ELECTRICAL TRANSMISSION CABLES", which claims priority to U.S. Provisional Patent Application Ser. No. 61/474,458, filed Apr. 12, 2011, titled: "COMPOSITE CORE FOR ELECTRICAL TRANSMISSION CABLES"; and also relates to U.S. Provisional Patent Application Ser. No. 61/474,423, filed Apr. 12, 2011, titled: "ELECTRICAL TRANSMISSION CABLES WITH COMPOSITE CORES", all of which are hereby incorporated by reference.

BACKGROUND OF THE INVENTION

Composite wire structures are commonly used as transmission lines or cable for transmitting electricity to users. Examples of composite transmission wire constructions include, for instance, aluminum conductor composite core (ACCC) reinforced cable and aluminum conductor steel reinforced (ACSR) cable. ACSR cable typically includes an aluminum outer conducting layer surrounding a steel inner core. The transmission lines are designed to not only efficiently transmit electricity, but must also be strong and temperature resistant, especially when the transmission lines are strung on towers and stretched over long distances. In fact, one of the major drawbacks of using steel-based transmission lines is that the cables tend to develop unacceptable sag when operating at higher temperatures.

To improve the properties of transmission lines, attempts have been made to construct the core of the cable with high strength polymers. U.S. Pat. No. 7,179,522 to Hiel, et al., for instance, describes a composite core formed from a carbon fiber-reinforced epoxy inner core surrounded by a glass fiber-reinforced epoxy outer core. According to Hiel, et al., the use of at least two different fiber types (carbon and glass fibers) is preferred to achieve a combination of strength, stiffness, and flexibility. Difficulties have nevertheless been encountered with composite cores containing more than one fiber type. For instance, because glass and carbon fibers have a different coefficient of thermal expansion, heat applied to the fibers during formation can cause the glass fibers to expand at a different rate than the carbon fibers. Upon cooling, the contracting glass forces the carbon into a compression state and results in residual stresses in the core. A few attempts have been made to make a core from a single fiber type. U.S. Patent Publication No. 2005/0186410 to Bryant, et al., for instance, describes attempts that were made to embed carbon fibers into a thermoplastic resin to form a single fiber composite core. Unfortunately, these cores exhibited flaws and dry spots due to inadequate wetting of the fibers, which resulted in poor durability and strength. Further, the carbon was susceptible to a galvanic reaction with aluminum, which could lead to corrosion and failure of the cable. Another problem with such cores is that the thermoplastic resins could not operate at a high temperature. For these reasons, Bryant, et al. developed a single fiber core that contained S-2 glass fibers embedded with a thermoset epoxy matrix. While such cores eliminated the problems of a two-fiber system, they nevertheless lacked the desired level of strength. Further, the use of thermoset resins is problematic in many manufacturing processes, and such resins also lack good bonding characteristics for forming layers with other materials.

As such, a need currently exists for a single fiber-type composite core that is formed from a thermoplastic material, and yet is still capable of achieving the desired strength, durability, and temperature performance demanded by a particular application.

SUMMARY OF THE INVENTION

In accordance with one embodiment of the present invention, an electrical transmission cable core is disclosed that extends in a longitudinal direction. The core comprises at least one rod that contains a continuous fiber component comprising a plurality of consolidated thermoplastic impregnated rovings. The rovings contain continuous fibers oriented in the longitudinal direction and a thermoplastic matrix that embeds the fibers. The fibers have a ratio of ultimate tensile strength to mass per unit length of greater than about 1,000 Megapascals per gram per meter. The continuous fibers constitute from about 25 wt. % to about 80 wt. % of the rod and the thermoplastic matrix constitutes from about 20 wt. % to about 75 wt. % of the rod. A capping layer surrounds the continuous fiber component that is free of continuous fibers. The rod has a minimum flexural modulus of about 10 Gigapascals.

In accordance with another embodiment of the present invention, a method for forming an electrical transmission cable core is disclosed. The method comprises impregnating a plurality of rovings with a thermoplastic matrix and consolidating the ravings to form a ribbon, wherein the rovings comprise continuous fibers oriented in the longitudinal direction. The fibers have a ratio of ultimate tensile strength to mass per unit length of greater than about 1,000 Megapascals per gram per meter. The continuous fibers constitute from about 25 wt. % to about 80 wt. % of the ribbon and the thermoplastic matrix constitutes from about 20 wt. % to about 75 wt. % of the ribbon. The ribbon is heated to a temperature at or above the melting temperature of the thermoplastic matrix and pulled through at least one forming die to compress and shape the ribbon into a rod. A capping layer is applied to the rod.

In accordance with yet another embodiment of the present invention, a method of making an electrical cable is disclosed. This method may comprise providing a cable core comprising at least one composite core, and surrounding the cable core with a plurality of conductive elements. The composite core may comprise at least one rod comprising a plurality of consolidated thermoplastic impregnated rovings. The rovings may comprise continuous fibers oriented in the longitudinal direction and a thermoplastic matrix that embeds the fibers. The fibers may have a ratio of ultimate tensile strength to mass per unit length of greater than about 1,000 MPa/g/m. Typically, the rod may comprise from about 25 wt. % to about 80 wt. % fibers, and from about 20 wt. % to about 75 wt. % thermoplastic matrix. A capping layer may surround the at least one rod, and this capping layer generally may be free of continuous fibers. In these and other embodiments, the composite core may have a flexural modulus of greater than about 10 GPa.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a perspective view of one embodiment of a consolidated ribbon for use in the present invention;

FIG. 2 is a cross-sectional view of another embodiment of a consolidated ribbon for use in the present invention;

FIG. 3 is a schematic illustration of one embodiment of an impregnation system for use in the present invention;

FIG. 4 is a cross-sectional view of the impregnation die shown in FIG. 3;

FIG. 5 is an exploded view of one embodiment of a manifold assembly and gate passage for an impregnation die that may be employed in the present invention;

FIG. 6 is a perspective view of one embodiment of a plate at least partially defining an impregnation zone that may be employed in the present invention;

FIG. 7 is a schematic illustration of one embodiment of a pultrusion system that may be employed in the present invention;

FIG. 8 is a perspective view of one embodiment of a rod of the present invention;

FIG. 9 is a perspective view of one embodiment of an electrical transmission cable made in accordance with the present invention;

FIG. 10 is a perspective view of another embodiment of an electrical transmission cable made in accordance with the present invention;

FIG. 11 is a top cross-sectional view of one embodiment of various calibration dies that may be employed in accordance with the present invention;

FIG. 12 is a side cross-sectional view of one embodiment of a calibration die that may be employed in accordance with the present invention;

FIG. 13 is a front view of a portion of one embodiment of a calibration die that may be employed in accordance with the present invention; and FIG. 14 is a front view of one embodiment of forming rollers that may be employed in accordance with the present invention.

Repeat use of reference characters in the present specification and drawings is intended to represent the same or analogous features or elements of the present invention.

DETAILED DESCRIPTION OF
REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a composite core for use in electrical cables, such as high voltage transmission cables. The composite core contains at least one rod that includes a continuous fiber component surrounded by a capping layer. The continuous fiber component is formed from a plurality of unidirectionally aligned fiber rovings embedded within a thermoplastic polymer matrix. The present inventors have discovered that the degree to which the rovings are impregnated with the thermoplastic polymer matrix can be significantly improved through selective control over the impregnation process, and also through control over the degree of compression imparted to the rovings during formation and shaping of the rod, as well as the calibration of the final rod geometry. Such a well impregnated rod has a very small void fraction, which leads to excellent strength properties. Notably, the desired strength properties may be achieved without the need for different fiber types in the rod.

As used herein, the term "roving" generally refers to a bundle or tow of individual fibers. The fibers contained within the roving can be twisted or can be straight. Although different fibers can be used in individual or different rovings, it is generally desired that each of the rovings contain a single fiber type to minimize any adverse impact of using material with a different thermal coefficient of expansion. The continuous fibers employed in the rovings possess a high degree of tensile strength relative to their mass. For example, the ultimate tensile strength of the fibers is typically from about 1,000 to about 15,000 Megapascals ("MPa"), in some embodiments from about 2,000 MPa to about 10,000 MPa, and in some embodiments, from about 3,000 MPa to about 6,000 MPa. Such tensile strengths may be achieved even though the fibers are of a relatively light weight, such as a mass per unit length of from about 0.1 to about 2 grams per meter, in some embodiments from about 0.4 to about 1.5 grams per meter. The ratio of tensile strength to mass per unit length may thus be about 1,000 Megapascals per gram per meter ("MPa/g/m") or greater, in some embodiments about 4,000 MPa/g/m or greater, and in some embodiments, from about 5,500 to about 20,000 MPa/g/m. Such high strength fibers may, for instance, be metal fibers, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Carbon fibers are particularly suitable for use as the continuous fibers, which typically have a tensile strength to mass ratio in the range of from about 5,000 to about 7,000 MPa/g/m. The continuous fibers often have a nominal diameter of about 4 to about 35 micrometers, and in some embodiments, from about 5 to about 35 micrometers. The number of fibers contained in each roving can be constant or vary from roving to roving. Typically, a roving contains from about 1,000 fibers to about 100,000 individual fibers, and in some embodiments, from about 5,000 to about 50,000 fibers.

Any of a variety of thermoplastic polymers may be employed to form the thermoplastic matrix in which the continuous fibers are embedded. Suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth.

The properties of the thermoplastic matrix are generally selected to achieve the desired combination of processability and performance of the rod during use. For example, the melt viscosity of the thermoplastic matrix is generally low enough so that the polymer can adequately impregnate the fibers and become shaped into the rod configuration. In this regard, the melt viscosity typically ranges from about 25 to about 2,000 Pascal-seconds ("Pa-s"), in some embodiments from 50 about 500 Pa-s, and in some embodiments, from about 60 to about 200 Pa-s, determined at the operating conditions used for the thermoplastic polymer (e.g., about 360° C.). Likewise, because the rod is intended for use at high temperatures (e.g., high voltage transmission cables), a thermoplastic polymer is employed that has a relatively high melting temperature. For example, the melting temperature of such high temperature polymers may range from about 200° C. to about 500° C., in some embodiments from about 225° C. to about 400° C., and in some embodiments, from about 250° C. to about 350° C.

Polyarylene sulfides are particularly suitable for use in the present invention as a high temperature matrix with the desired melt viscosity. Polyphenylene sulfide, for example, is a semi-crystalline resin that generally includes repeating monomeric units represented by the following general formula:

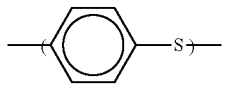

These monomeric units typically constitute at least 80 mole %, and in some embodiments, at least 90 mole %, of the recurring units, in the polymer. It should be understood, however, the polyphenylene sulfide may contain additional recurring units, such as described in U.S. Pat. No. 5,075,381 to Gotoh, et al., which is incorporated herein in its entirety by reference thereto for all purposes. When employed, such additional recurring units typically constitute no more than about 20 mole % of the polymer. Commercially available high melt viscosity polyphenylene sulfides may include those available from Ticona, LLC (Florence, Ky.) under the trade designation FORTRON®. Such polymers may have a melting temperature of about 285° C. (determined according to ISO 11357-1,2,3) and a melt viscosity of from about 260 to about 320 Pascal-seconds at 310° C.

According to the present invention, an extrusion device is generally employed to impregnate the rovings with the thermoplastic matrix. Among other things, the extrusion device facilitates the ability of the thermoplastic polymer to be applied to the entire surface of the fibers. The impregnated rovings also have a low void fraction, which helps enhance its strength. For instance, the void fraction may be about 6% or less, in some embodiments about 4% or less, in some embodiments about 3% or less, in some embodiments about 2% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the thermoplastic matrix, which may then be used to calculate the "void fraction" based on the following equations:

$$V_f = 100 * (\rho_t - \rho_c) / \rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t 1 / [W_f / \rho_f + W_m / \rho_m]$$

$\rho_m$ is the density of the thermoplastic matrix (e.g., at the appropriate crystallinity);

$\rho_f$ is the density of the fibers;

$W_f$ is the weight fraction of the fibers; and $W_m$ is the weight fraction of the thermoplastic matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the thermoplastic polymer, fibers, and ribbon (or tape) in accordance with ASTM D 2734-09 (Method A), where the densities may be determined ASTM D792-08 Method A. Of course, the void fraction can also be estimated using conventional microscopy equipment, or through the use of computed tomography (CT) scan equipment, such as a Metrotom 1500 (2 k×2 k) high resolution detector.

Referring to FIG. 3, one embodiment of such an extrusion device is shown. More particularly, the apparatus includes an extruder 120 containing a screw shaft 124 mounted inside a barrel 122. A heater 130 (e.g., electrical resistance heater) is mounted outside the barrel 122. During use, a thermoplastic polymer feedstock 127 is supplied to the extruder 120 through a hopper 126. The thermoplastic feedstock 127 is conveyed inside the barrel 122 by the screw shaft 124 and heated by frictional forces inside the barrel 122 and by the heater 130. Upon being heated, the feedstock 127 exits the barrel 122 through a barrel flange 128 and enters a die flange 132 of an impregnation die 150.

A continuous fiber roving 142 or a plurality of continuous fiber rovings 142 are supplied from a reel or reels 144 to die 150. The rovings 142 are generally kept apart a certain distance before impregnation, such as at least about 4 millimeters, and in some embodiments, at least about 5 millimeters. The feedstock 127 may further be heated inside the die by heaters 133 mounted in or around the die 150. The die is generally operated at temperatures that are sufficient to cause melting and impregnation of the thermoplastic polymer. Typically, the operation temperatures of the die is higher than the melt temperature of the thermoplastic polymer, such as at temperatures from about 200° C. to about 450° C. When processed in this manner, the continuous fiber rovings 142 become embedded in the polymer matrix, which may be a resin 214 (FIG. 4) processed from the feedstock 127. The mixture is then extruded from the impregnation die 150 to create an extrudate 152.

A pressure sensor 137 (FIG. 3) senses the pressure near the impregnation die 150 to allow control to be exerted over the rate of extrusion by controlling the rotational speed of the screw shaft 124, or the federate of the feeder. That is, the pressure sensor 137 is positioned near the impregnation die 150 so that the extruder 120 can be operated to deliver a correct amount of resin 214 for interaction with the fiber rovings 142. After leaving the impregnation die 150, the extrudate 152, or impregnated fiber rovings 142, may enter an optional pre-shaping, or guiding section (not shown)

before entering a nip formed between two adjacent rollers 190. Although optional, the rollers 190 can help to consolidate the extrudate 152 into the form of a ribbon (or tape), as well as enhance fiber impregnation and squeeze out any excess voids. In addition to the rollers 190, other shaping devices may also be employed, such as a die system. The resulting consolidated ribbon 156 is pulled by tracks 162 and 164 mounted on rollers. The tracks 162 and 164 also pull the extrudate 152 from the impregnation die 150 and through the rollers 190. If desired, the consolidated ribbon 156 may be wound up at a section 171. Generally speaking, the ribbons are relatively thin and typically have a thickness of from about 0.05 to about 1 millimeter, in some embodiments from about 0.1 to about 0.8 millimeters, and in some embodiments, from about 0.2 to about 0.4 millimeters.

Within the impregnation die, it is generally desired that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which significantly enhances the degree of impregnation. This is particularly useful when forming a composite from ribbons of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, rod, etc. The contact surfaces 252 are also typically made of a metal material.

FIG. 4 shows a cross-sectional view of an impregnation die 150. As shown, the impregnation die 150 includes a manifold assembly 220, a gate passage 270, and an impregnation zone 250. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

As shown in FIG. 5, some portions of the channels 222 may be curvilinear, and in exemplary embodiments, the channels 222 have a symmetrical orientation along a central axis 224. Further, in some embodiments, the channels may be a plurality of branched runners 222, which may include first branched runner group 232, second group 234, third group 236, and, if desired, more branched runner groups. Each group may include 2, 3, 4 or more runners 222 branching off from runners 222 in the preceding group, or from an initial channel 222.

The branched runners 222 and the symmetrical orientation thereof generally evenly distribute the resin 214, such that the flow of resin 214 exiting the manifold assembly 220 and coating the ravings 142 is substantially uniformly distributed on the rovings 142. This desirably allows for generally uniform impregnation of the rovings 142.

Further, the manifold assembly 220 may in some embodiments define an outlet region 242, which generally encompasses at least a downstream portion of the channels or runners 222 from which the resin 214 exits. In some embodiments, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the ravings 142.

As further illustrated in FIGS. 4 and 5, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough, as shown.

Upon exiting the manifold assembly 220 and the gate passage 270 of the die 150 as shown in FIG. 4, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the ravings 142, or on a lower surface of each of the rovings 142, or on both an upper and lower surface of each of the rovings 142. Initial impingement on the rovings 142 provides for further impregnation of the rovings 142 with the resin 214.

As shown in FIG. 4, the coated rovings 142 are traversed in run direction 282 through impregnation zone 250, which is configured to impregnate the rovings 142 with the resin 214. For example, as shown in FIGS. 4 and 6, the rovings 142 are traversed over contact surfaces 252 in the impregnation zone. Impingement of the ravings 142 on the contact surface 252 creates shear and pressure sufficient to impregnate the rovings 142 with the resin 214 coating the rovings 142.

In some embodiments, as shown in FIG. 4, the impregnation zone 250 is defined between two spaced apart opposing plates 256 and 258. First plate 256 defines a first inner surface 257, while second plate 258 defines a second inner surface 259. The contact surfaces 252 may be defined on or extend from both the first and second inner surfaces 257 and 259, or only one of the first and second inner surfaces 257 and 259. FIG. 6 illustrates the second plate 258 and the various contact surfaces thereon that form at least a portion of the impregnation zone 250 according to these embodiments. In exemplary embodiments, as shown in FIG. 4, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

Angle 254 at which the rovings 142 traverse the contact surfaces 252 may be generally high enough to enhance shear, but not so high to cause excessive forces that will break the fibers. Thus, for example, the angle 254 may be in the range between approximately 1° and approximately 30°, and in some embodiments, between approximately 5° and approximately 25°.

In alternative embodiments, the impregnation zone 250 may include a plurality of pins (not shown), each pin having a contact surface 252. The pins may be static, freely rotational, or rotationally driven. In further alternative embodiments, the contact surfaces 252 and impregnation zone 250 may comprise any suitable shapes and/or structures for impregnating the rovings 142 with the resin 214 as desired or required.

To further facilitate impregnation of the rovings 142, they may also be kept under tension while present within the impregnation die. The tension may, for example, range from about 5 to about 300 Newtons, in some embodiments from about 50 to about 250 Newtons, and in some embodiments, from about 100 to about 200 Newtons per roving 142 or tow of fibers.

As shown in FIG. 4, in some embodiments, a land zone 280 may be positioned downstream of the impregnation zone 250 in run direction 282 of the rovings 142. The rovings 142 may traverse through the land zone 280 before exiting the die 150. As further shown in FIG. 4, in some embodiments, a faceplate 290 may adjoin the impregnation zone 250. Faceplate 290 is generally configured to meter excess resin 214 from the rovings 142. Thus, apertures in the faceplate 290, through which the rovings 142 traverse, may be sized such that when the ravings 142 are traversed therethrough, the size of the apertures causes excess resin 214 to be removed from the ravings 142.

The impregnation die shown and described above is but one of various possible configurations that may be employed in the present invention. In alternative embodiments, for example, the rovings may be introduced into a crosshead die that is positioned at an angle relative to the direction of flow of the polymer melt. As the rovings move through the crosshead die and reach the point where the polymer exits from an extruder barrel, the polymer is forced into contact with the rovings. Examples of such a crosshead die extruder are described, for instance, in U.S. Pat. No. 3,993,726 to Moyer; U.S. Pat. No. 4,588,538 to Chung, et al.; U.S. Pat. No. 5,277,566 to Augustin, et al.; and U.S. Pat. No. 5,658,513 to Amaike, et al., which are incorporated herein in their entirety by reference thereto for all purposes. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a roving of individual fibers, which may each contain up to as many as 24,000 fibers, across the entire width of the merged tow. This helps achieve uniform distribution of strength properties. Such an assembly may include a supply of compressed air or another gas that impinges in a generally perpendicular fashion on the moving rovings that pass across the exit ports. The spread rovings may then be introduced into a die for impregnation, such as described above.

Regardless of the technique employed, the continuous fibers are oriented in the longitudinal direction (the machine direction "A" of the system of FIG. 3) to enhance tensile strength. Besides fiber orientation, other aspects of the pultrusion process are also controlled to achieve the desired strength. For example, a relatively high percentage of continuous fibers are employed in the consolidated ribbon to provide enhanced strength properties. For instance, continuous fibers typically constitute from about 25 wt. % to about 80 wt. %, in some embodiments from about 30 wt. % to about 75 wt. %, and in some embodiments, from about 35 wt. % to about 60 wt. % of the ribbon. Likewise, thermoplastic polymer(s) typically constitute from about 20 wt. % to about 75 wt. %, in some embodiments from about 25 wt. % to about 70 wt. %, and in some embodiments, from about 40 wt. % to about 65 wt. % of the ribbon. The percentage of the fibers and thermoplastic matrix in the final rod may also be within the ranges noted above.

As noted above, the ravings may be consolidated into the form of one or more ribbons before being shaped into the desired rod configuration. When such a ribbon is subsequently compressed, the rovings can become distributed in a generally uniform manner about a longitudinal center of the rod. Such a uniform distribution enhances the consistency of the strength properties (e.g., flexural modulus, ultimate tensile strength, etc.) over the entire length of the rod. When employed, the number of consolidated ribbons used to form the rod will vary based on the desired thickness and/or cross-sectional area and strength of the rod, as well as the nature of the ribbons themselves. In most cases, however, the number of ribbons is from 1 to 20, and in some embodiments, from 2 to 10. The number of rovings employed in each ribbon may likewise vary. Typically, however, a ribbon will contain from 2 to 10 ravings, and in some embodiments, from 3 to 5 ravings. To help achieve the symmetric distribution of the rovings in the final rod, it is generally desired that they are spaced apart approximately the same distance from each other within the ribbon. Referring to FIG. 1, for example, one embodiment of a consolidated ribbon 4 is shown that contains three (3) rovings 5 spaced equidistant from each other in the −x direction. In other embodiments, however, it may be desired that the rovings are combined, such that the fibers of the rovings are generally evenly distributed throughout the ribbon 4. In these embodiments, the ravings may be generally indistinguishable from each other. Referring to FIG. 2, for example, one embodiment of a consolidated ribbon 4 is shown that contains ravings that are combined such that the fibers are generally evenly distributed.

The specific manner in which the rovings are shaped is also carefully controlled to ensure that rod can be formed with an adequate degree of compression and strength properties. Referring to FIG. 7, for example, one particular embodiment of a system and method for forming a rod are shown. In this embodiment, two ribbons 12 are initially provided in a wound package on a creel 20. The creel 20 may be an unreeling creel that includes a frame provided with horizontal spindles 22, each supporting a package. A pay-out creel may also be employed, particularly if desired to induce a twist into the fibers, such as when using raw fibers in a one-step configuration. It should also be understood that the ribbons may also be formed in-line with the formation of the rod. In one embodiment, for example, the extrudate 152 exiting the impregnation die 150 from FIG. 3 may be directly supplied to the system used to form a rod. A tension-regulating device 40 may also be employed to help control the degree of tension in the ribbons 12. The device 40 may include inlet plate 30 that lies in a vertical plane parallel to the rotating spindles 22 of the creel 20 and/or perpendicular to the incoming ribbons. The tension-regulating device 40 may contain cylindrical bars 41 arranged in a staggered configuration so that the ribbon 12 passes over and under these bars to define a wave pattern. The height of the bars can be adjusted to modify the amplitude of the wave pattern and control tension.

The ribbons 12 may be heated in an oven 45 before entering the consolidation die. Heating may be conducted using any known type of oven, as in an infrared oven, convection oven, etc. During heating, the fibers in the ribbon are unidirectionally oriented to optimize the exposure to the heat and maintain even heat across the entire ribbon. The temperature to which the ribbons 12 are heated is generally high enough to soften the thermoplastic polymer to an extent that the ribbons can bond together. However, the temperature is not so high as to destroy the integrity of the material. The temperature may, for example, range from about 100° C. to about 500° C., in some embodiments from about 200° C. to about 400° C., and in some embodiments, from about 250° C. to about 350° C. In one particular embodiment, for example, polyphenylene sulfide ("PPS") is used as the polymer, and the ribbons are heated to or above the melting point of PPS, which is about 285° C.

Upon being heated, the ribbons 12 are provided to a consolidation die 50 that compresses them together into a preform 14, as well as aligns and forms the initial shape of the rod. As shown generally in FIG. 7, for example, the ribbons 12 are guided through a flow passage 51 of the die 50 in a direction "A" from an inlet 53 to an outlet 55. The passage 51 may have any of a variety of shapes and/or sizes to achieve the rod configuration. For example, the channel and rod configuration may be circular, elliptical, parabolic, etc. Within the die 50, the ribbons are generally maintained at a temperature at or above the melting point of the thermoplastic matrix used in the ribbon to ensure adequate consolidation.

The desired heating, compression, and shaping of the ribbons 12 may be accomplished through the use of a die 50 having one or multiple sections. For instance, although not shown in detail herein, the consolidation die 50 may possess multiple sections that function together to compress and shape the ribbons 12 into the desired configuration. For instance, a first section of the passage 51 may be a tapered zone that initially shapes the material as it flows from into the die 50. The tapered zone generally possesses a cross-sectional area that is larger at its inlet than at its outlet. For example, the cross-sectional area of the passage 51 at the inlet of the tapered zone may be about 2% or more, in some embodiments about 5% or more, and in some embodiments, from about 10% to about 20% greater than the cross-sectional area at the outlet of the tapered zone. Regardless, the cross-sectional of the flow passage typically changes gradually and smoothly within the tapered zone so that a balanced flow of the composite material through the die can be maintained. A shaping zone may also follow the tapered zone that compresses the material and provides a generally homogeneous flow therethrough. The shaping zone may also pre-shape the material into an intermediate shape that is similar to that of the rod, but typically of a larger cross-sectional area to allow for expansion of the thermoplastic polymer while heated to minimize the risk of backup within the die 50. The shaping zone could also include one or more surface features that impart a directional change to the preform. The directional change forces the material to be redistributed resulting in a more even distribution of the fiber/resin in the final shape. This also reduces the risk of dead spots in the die that can cause burning of the resin. For example, the cross-sectional area of the passage 51 at the shaping zone may be about 2% or more, in some embodiments about 5% or more, and in some embodiments, from about 10% to about 20% greater than the width of the preform 14. A die land may also follow the shaping zone to serve as an outlet for the passage 51. The shaping zone, tapered zone, and/or die land may be heated to a temperature at or above that of the glass transition temperature or melting point of the thermoplastic matrix.

If desired, a second die 60 (e.g., calibration die) may also be employed that compresses the preform 14 into the final shape of the rod. When employed, it is sometimes desired that the preform 14 is allowed to cool briefly after exiting the consolidation die 50 and before entering the optional second die 60. This allows the consolidated preform 14 to retain its initial shape before progressing further through the system. Typically, cooling reduces the temperature of the exterior of the rod below the melting point temperature of the thermoplastic matrix to minimize and substantially prevent the occurrence of melt fracture on the exterior surface of the rod. The internal section of the rod, however, may remain molten to ensure compression when the rod enters the calibration die body. Such cooling may be accomplished by simply exposing the preform 14 to the ambient atmosphere (e.g., room temperature) or through the use of active cooling techniques (e.g., water bath or air cooling) as is known in the art. In one embodiment, for example, air is blown onto the preform 14 (e.g., with an air ring). The cooling between these stages, however, generally occurs over a small period of time to ensure that the preform 14 is still soft enough to be further shaped. For example, after exiting the consolidation die 50, the preform 14 may be exposed to the ambient environment for only from about 1 to about 20 seconds, and in some embodiments, from about 2 to about 10 seconds, before entering the second die 60. Within the die 60, the preform is generally kept at a temperature below the melting point of the thermoplastic matrix used in the ribbon so that the shape of the rod can be maintained. Although referred to above as single dies, it should be understood that the dies 50 and 60 may in fact be formed from multiple individual dies (e.g., face plate dies).

Thus, in some embodiments, multiple individual dies 60 may be utilized to gradually shape the material into the desired configuration. The dies 60 are placed in series, and provide for gradual decreases in the dimensions of the material. Such gradual decreases allow for shrinkage during and between the various steps.

For example, as shown in FIGS. 11 through 13, a first die 60 may include one or more inlet 62 and corresponding outlets 64, as shown. Any number of inlets 62 and corresponding outlets 64 may be included in a die 60, such as four as shown, one, two, three, five, six, or more. An inlet 62 in some embodiments may be generally oval or circle shaped. In other embodiments, the inlet 62 may have a curved rectangular shape, i.e. a rectangular shape with curved corners or a rectangular shape with straight longer sidewalls and curved shorter sidewalls. Further, an outlet 64 may be generally oval or circle shaped, or may have a curved rectangular shape. In some embodiments wherein an oval shaped inlet is utilized, the inlet 62 may have a major axis length 66 to minor axis length 68 ratio in a range between approximately 3 to 1 and approximately 5 to 1. In some embodiments wherein an oval or circular shaped inlet is utilized, the outlet 64 may have a major axis length 66 to minor axis length 68 ratio in a range between approximately 1 to 1 and approximately 3 to 1. In embodiments wherein a curved rectangular shape is utilized, the inlet and outlet may have major axis length 66 to minor axis length 66 ratios (aspect ratios) between approximately 2 to 1 and approximately 7 to 1, with the outlet 64 ratio being less than the inlet 62 ratio.

In further embodiments, the cross-sectional area of an inlet 62 and the cross-sectional area of a corresponding outlet 64 of the first die 60 may have a ratio in a range between approximately 1.5 to 1 and 6 to 1.

The first die 60 thus provides a generally smooth transformation of polymer impregnated fiber material to a shape that is relatively similar to a final shape of the resulting rod, which in exemplary embodiments has a circular or oval shaped cross-section. Subsequent dies, such as a second die 60 and third die 60 as shown in FIG. 11, may provide for further gradual decreases and/or changes in the dimensions of the material, such that the shape of the material is converted to a final cross-sectional shape of the rod. These subsequent dies 60 may both shape and cool the material. For example, in some embodiments, each subsequent die 60 may be maintained at a lower temperature than the previous dies. In exemplary embodiments, all dies 60 are maintained at temperatures that are higher than a softening point temperature for the material.

In further exemplary embodiments, dies 60 having relatively long land lengths 69 may be desired, due to for example desires for proper cooling and solidification, which are critical in achieving a desired rod shape and size. Relatively long land lengths 69 reduce stresses and provide smooth transformations to desired shapes and sizes, and with minimal void fraction and bow characteristics. In some embodiments, for example, a ratio of land length 69 at an outlet 64 to major axis length 66 at the outlet 64 for a die 60 may be in the range between approximately 0 and approximately 20, such as between approximately 2 and approximately 6.

The use of calibration dies 60 according to the present disclosure provides for gradual changes in material cross-section, as discussed. These gradual changes may in exemplary embodiments ensure that the resulting product, such as a rod or other suitable product, has a generally uniform fiber distribution with relatively minimal void fraction.

It should be understood that any suitable number of dies 60 may be utilized to gradually form the material into a profile having any suitable cross-sectional shape, as desired or required by various applications.

In addition to the use of one or more dies, other mechanisms may also be employed to help compress the preform 14 into the shape of a rod. For example, forming rollers 90, as shown in FIG. 14, may be employed between the consolidation die 50 and the calibration die 60, between the various calibration dies 60, and/or after the calibration dies 60 to further compress the preform 14 before it is converted into its final shape. The rollers may have any configuration, such as pinch rollers, overlapping rollers, etc., and may be vertical as shown or horizontal rollers. Depending on the roller 90 configuration, the surfaces of the rollers 90 may be machined to impart the dimensions of the final product, such as the rod, profile, or other suitable product, to the preform 14. In exemplary embodiment, the pressure of the rollers 90 should be adjustable to optimize the quality of the final product.

The rollers 90 in exemplary embodiments, such as at least the portions contacting the material, may have generally smooth surfaces. For example, relatively hard, polished surfaces are desired in many embodiments. For example, the surface of the rollers may be formed from a relatively smooth chrome or other suitable material. This allows the rollers 90 to manipulate the preform 14 without damaging or undesirably altering the preform 14. For example, such surfaces may prevent the material from sticking to the rollers, and the rollers may impart smooth surfaces onto the materials.

In some embodiments, the temperature of the rollers 90 is controlled. This may be accomplished by heating of the rollers 90 themselves, or by placing the rollers 90 in a temperature controlled environment.

Further, in some embodiments, surface features 92 may be provided on the rollers 90. The surface features 92 may guide and/or control the preform 14 in one or more directions as it is passed through the rollers. For example, surface features 92 may be provided to prevent the preform 14 from folding over on itself as it is passed through the rollers 90. Thus, the surface features 92 may guide and control deformation of the preform 14 in the cross-machine direction relative to the machine direction A as well as in the vertical direction relative to the machine direction A. The preform 14 may thus be pushed together in the cross-machine direction, rather than folded over on itself, as it is passed through the rollers 90 in the machine direction A.

In some embodiments, tension regulation devices may be provided in communication with the rollers. These devices may be utilized with the rollers to apply tension to the preform 14 in the machine direction, cross-machine direction, and/or vertical direction to further guide and/or control the preform.

As indicated above, the resulting rod is also applied with a capping layer to protect it from environmental conditions or to improve wear resistance. Referring again to FIG. 7, for example, such a capping layer may be applied via an extruder oriented at any desired angle to introduce a thermoplastic resin into a capping die 72. To help prevent a galvanic response, it is typically desired that the capping material has a dielectric strength of at least about 1 kilivolt per millimeter (kV/mm), in some embodiments at least about 2 kV/mm, in some embodiments from about 3 kV/mm to about 50 kV/mm, and in some embodiments, from about 4 kV/mm to about 30 kV/mm, such as determined in accordance with ASTM D149-09. Suitable thermoplastic polymers for this purpose may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), acrylic polymers, polyvinyl chloride (PVC), etc. Particularly suitable high dielectric strength capping layer materials may include polyketone (e.g., polyetherether ketone ("PEEK")), polysulfide (e.g., polyarylene sulfide), or a mixture thereof.

The capping layer is generally free of continuous fibers. That is, the capping layer contains less than about 10 wt. % of continuous fibers, in some embodiments about 5 wt. % or less of continuous fibers, and in some embodiments, about 1 wt. % or less of continuous fibers (e.g., 0 wt. %). Nevertheless, the capping layer may contain other additives for improving the final properties of the rod. Additive materials employed at this stage may include those that are not suitable for incorporating into the continuous fiber material. For instance, it may be desirable to add pigments to reduce finishing labor, or it may be desirable to add flame retardant agents to enhance the flame retarding features of the rod. Because many additive materials are heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

While not shown in detail herein, the capping die 72 may include various features known in the art to help achieve the desired application of the capping layer. For instance, the capping die 72 may include an entrance guide that aligns the incoming rod. The capping die may also include a heating mechanism (e.g., heated plate) that pre-heats the rod before application of the capping layer to help ensure adequate bonding. Following capping, the shaped part 15 is then finally cooled using a cooling system 80 as is known in the art. The cooling system 80 may, for instance, be a sizing system that includes one or more blocks (e.g., aluminum blocks) that completely encapsulate the rod while a vacuum pulls the hot shape out against its walls as it cools. A cooling medium may be supplied to the sizer, such as air or water, to solidify the rod in the correct shape.

Even if a sizing system is not employed, it is generally desired to cool the rod after it exits the capping die (or the consolidation or calibration die if capping is not applied). Cooling may occur using any technique known in the art, such a water tank, cool air stream or air jet, cooling jacket, an internal cooling channel, cooling fluid circulation channels, etc. Regardless, the temperature at which the material is cooled is usually controlled to achieve optimal mechanical properties, part dimensional tolerances, good processing, and an aesthetically pleasing composite. For instance, if the temperature of the cooling station is too high, the material might swell in the tool and interrupt the process. For semi-crystalline materials, too low of a temperature can likewise cause the material to cool down too rapidly and not allow complete crystallization, thereby jeopardizing the mechanical and chemical resistance properties of the composite. Multiple cooling die sections with independent temperature control can be utilized to impart the optimal balance of processing and performance attributes. In one particular embodiment, for example, a water tank is employed that is kept at a temperature of from about 0° C. to about 30° C., in some embodiments from about 1° C. to about 20° C., and in some embodiments, from about 2° C. to about 15° C.

If desired, one or more sizing blocks (not shown) may also be employed, such as after capping. Such blocks contain openings that are cut to the exact rod shape, graduated from oversized at first to the final rod shape. As the rod passes therethrough, any tendency for it to move or sag is counteracted, and it is pushed back (repeatedly) to its correct shape. Once sized, the rod may be cut to the desired length at a cutting station (not shown), such as with a cut-off saw capable of performing cross-sectional cuts or the rod can be wound on a reel in a continuous process. The length of rod will then be limited to the length of the fiber tow.

As will be appreciated, the temperature of the rod as it advances through any section of the system of the present invention may be controlled to yield optimal manufacturing and desired final composite properties. Any or all of the assembly sections may be temperature controlled utilizing electrical cartridge heaters, circulated fluid cooling, etc., or any other temperature controlling device known to those skilled in the art.

Referring again to FIG. 7, a pulling device 82 is positioned downstream from the cooling system 80 that pulls the finished rod 16 through the system for final sizing of the composite. The pulling device 82 may be any device capable of pulling the rod through the process system at a desired rate. Typical pulling devices include, for example, caterpillar pullers and reciprocating pullers.

One embodiment of the rod formed from the method described above is shown in more detail in FIG. 8 as element 516. As illustrated, the rod 516 has a generally circular shape and includes a continuous fiber component 514 formed from one or more consolidated ribbons. By "generally circular", it is generally meant that the aspect ratio of the rod (height divided by the width) is typically from about 1.0 to about 1.5, and in some embodiments, about 1.0. Due to the selective control over the process used to impregnate the rovings and form a consolidated ribbon, as well the process for compressing and shaping the ribbon, the rod is able to possess a relatively even distribution of the thermoplastic matrix across along its entire length. This also means that the continuous fibers are distributed in a generally uniform manner about a longitudinal central axis "L" of the rod 516. As shown in FIG. 8, for example, the rod 514 includes continuous fibers 526 embedded within a thermoplastic matrix 528. The fibers 526 are distributed generally uniformly about the longitudinal axis "L." It should be understood that only a few fibers are shown in FIG. 8, and that the rod will typically contain a substantially greater number of uniformly distributed fibers. A capping layer 519 also extends around the perimeter of the continuous fiber component 514 and defines an external surface of the rod 516. The cross-sectional thickness ("T") of the continuous fiber component 514 may be strategically selected to help achieve a particular strength. For example, the component 514 may have a thickness (e.g., diameter) of from about 0.1 to about 40 millimeters, in some embodiments from about 0.5 to about 30 millimeters, and in some embodiments, from about 1 to about 10 millimeters. The thickness of the capping layer 519 depends on the intended function of the part, but is typically from about 0.01 to about 10 millimeters, and in some embodiments, from about 0.02 to about 5 millimeters. Regardless, the total cross-sectional thickness or height of the rod typically ranges from about of from about 0.1 to about 50 millimeters, in some embodiments from about 0.5 to about 40 millimeters, and in some embodiments, from about 1 to about 20 millimeters. While the rod may be substantially continuous in length, the length of the rod is often practically limited by the spool onto which it will be wound and stored or the length of the continuous fibers. For example, the length often ranges from about 1000 to about 5000 meters, although even greater lengths are certainly possible.

Through control over the various parameters mentioned above, rods having a very high strength may be formed. For example, the rods may exhibit a relatively high flexural modulus. The term "flexural modulus" generally refers to the ratio of stress to strain in flexural deformation (units of force per area), or the tendency for a material to bend. It is determined from the slope of a stress-strain curve produced by a "three point flexural" test (such as ASTM D790-10, Procedure A), typically at room temperature. For example, the rod of the present invention may exhibit a flexural modulus of from about 10 Gigapascals ("GPa") or more, in some embodiments from about 12 to about 400 GPa, in some embodiments from about 15 to about 200 GPa, and in some embodiments, from about 20 to about 150 GPa. Furthermore, the ultimate tensile strength may be about 300 Megapascals ("MPa") or more, in some embodiments from about 400 MPa to about 5,000 MPa, and in some embodiments, from about 500 MPa to about 3,500 MPa. The term "ultimate tensile strength" generally refers to the maximum stress that a material can withstand while being stretched or pulled before necking and is the maximum stress reached on a stress-strain curve produced by a tensile test (such as ASTM D3916-08) at room temperature. The tensile modulus of elasticity may also be about 50 GPa or more, in some embodiments from about 70 GPa to about 500 GPa, and in some embodiments, from about 100 GPa to about 300 GPa. The term "tensile modulus of elasticity" generally refers to the ratio of tensile stress over tensile strain and is the slope of a stress-strain curve produced by a tensile test (such as ASTM 3916-08) at room temperature. Notably, the strength properties of the composite rod referenced above may also be maintained over a relatively wide temperature range, such as from about −40° C. to about 300° C., and particularly from about 180° C. to 200° C.

Rods made according to the present disclosure may further have relatively flexural fatigue life, and may exhibit relatively high residual strength. Flexural fatigue life and residual flexural strength may be determined based on a "three point flexural fatigue" test (such as ASTM D790, typically at room temperature. For example, the rods of the present invention may exhibit residual flexural strength after one million cycles at 160 Newtons ("N") or 180 N loads of from about 60 kilograms per square inch ("ksi") to about 115 ksi, in some embodiments about 70 ksi to about 115 ksi, and in some embodiments about 95 ksi to about 115 ksi. Further, the rods may exhibit relatively minimal reductions in flexural strength. For example, rods having void fractions of about 4% or less, in some embodiments about 3% or less, may exhibit reductions in flexural strength after three point flexural fatigue testing of about 1% (for example, from a maximum pristine flexural strength of about 106 ksi to a maximum residual flexural strength of about 105 ksi). Flexural strength may be tested before and after fatigue testing using, for example, a three point flexural test as discussed above.

The linear thermal expansion coefficient of the composite rod may be, on a ppm basis per ° C., less than about 5, less than about 4, less than about 3, or less than about 2. For instance, the coefficient (ppm/° C.) may be in a range from about −0.25 to about 5; alternatively, from about −0.17 to about 4; alternatively, from about −0.17 to about 3; alternatively, from about −0.17 to about 2; or alternatively, from about 0.29 to about 1.18. The temperature range contemplated for this linear thermal expansion coefficient may be generally in the −50° C. to 200° C. range, the 0° C. to 200° C. range, the 0° C. to 175° C. range, or the 25° C. to 150° C. range. The linear thermal expansion coefficient is measured in the longitudinal direction, i.e., along the length of the fibers.

The composite rod may also exhibit a relatively small "bend radius", which is the minimum radius that the rod can be bent without breaking and is measured to the inside curvature of the rod. A smaller bend radius means that the rod is more flexible and can be spooled onto a smaller diameter bobbin. This property also makes the rod easier to implement in processes that currently use metal rods. Due to the improved process and resulting rod of the present invention, bend radiuses may be achieved that are less than about 40 times the outer diameter of the rod, in some embodiments from about 1 to about 30 times the outer diameter of the rod, and in some embodiments, from about 2 to about 25 times the outer diameter of the rod, determined at a temperature of about 25° C. For instance, the bend radius may be less than about 15 centimeters, in some embodiments from about 0.5 to about 10 centimeters, and in some embodiments, from about 1 to about 6 centimeters, determined at a temperature of about 25° C.

The composite rod also has a low void fraction, such as about 6% or less, in some embodiments about 3% or less, in some embodiments about 2% or less, in some embodiments about 1% or less, and in some embodiments, about 0.5% or less. The void fraction may be determined in the manner described above, such as using a "resin burn off" test in accordance with ASTM D 2584-08 or through the use of computed tomography (CT) scan equipment, such as a Metrotom 1500 (2 k×2 k) high resolution detector.

In addition to the parameters noted above, the composite rod may also exhibit a stress parameter that is about 10 MPa or more, in some embodiments about 15 MPa or more, and in some embodiments, from about 20 to about 50 MPa. The method for determining the stress parameter is described in more detail in U.S. Pat. No. 7,093,416 to Johnson, et al, which is incorporated herein in its entirety by reference thereto for all purposes. For example, sag and temperature may be measured and plotted as a graph of sag versus temperature. A calculated curve is fit to the measured data using an Alcoa Sag10 graphic method available in a software program from Alcoa Fujikura Ltd. (Greenville, S.C.) under the trade designation SAG10 (version 3.0 update 3.9.7). The stress parameter is a fitting parameter in SAG10 labeled as the "built-in aluminum stress", which can be altered to fit other parameters if material other than aluminum is used (e.g., aluminum alloy), and which adjusts the position of the knee-point on the predicted graph and also the amount of sag in the high temperature, post-knee-point regime. A description of the stress parameter is also provided in the Alcoa Sag10 Users Manual (Version 2.0).

As will be appreciated, the particular rod embodiment described above is merely exemplary of the numerous designs that are made possible by the present invention. Among the various possible rod designs, it should be understood that additional layers of material may be employed in addition to those described above. In certain embodiments, for example, it may be desirable to form a multi-component rod in which one component is formed from a higher strength material and another component is formed from a lower strength material. Such multi-component rods may be particularly useful in increasing overall strength without requiring the need for more expensive high strength materials for the entire rod. The lower and/or higher strength components may be formed from ribbon(s) that contain continuous fibers embedded within a thermoplastic matrix.

It should be understood that the present invention is by no means limited to the embodiments described above. For example, the rods may contain various other components depending on the desired application. The additional components may be formed from a continuous fiber ribbon, such as described herein, as well as other types of materials. In one embodiment, for example, the rod may contain a layer of discontinuous fibers (e.g., short fibers, long fibers, etc.) to improve its transverse strength. The discontinuous fibers may be oriented so that at least a portion of the fibers are positioned at an angle relative to the direction in which the continuous fibers extend.

As indicated above, the rods of the present invention may be employed in electrical cables (e.g., high voltage transmission wires). Exemplary transmission cable designs and composites cores for such cables are described in more detail in U.S. Pat. No. 7,211,319 to Heil, et al., which is incorporated herein in its entirety by reference thereto for all purposes. Generally speaking, such transmission cables contain a core surrounded by a plurality of conductive elements. The core may contain only a single rod as depicted in FIG. 8, or it may contain multiple rods. In certain embodiments, for example, the core may contain two or more layers of concentrically arranged rods, which may be stranded together in a variety of different patterns (e.g., helical). In one particular embodiment, for example, the core contains a center rod, a second layer of rods (e.g., 6 rods) concentrically disposed about the center rod, and a third layer of rods (e.g., 12 rods) concentrically disposed about the second layer. The conductive elements can be made from any suitable conductive material, such as a metal (e.g., copper, aluminum, or alloys thereof), carbon, etc. The manner in which the conductive elements may vary as is known in the art. If desired, the conductive elements may also be formed from materials such as described above.

Referring to FIG. 9, for instance, one embodiment of a transmission line generally 420 is shown. As illustrated, the transmission line 420 includes a plurality of conductive elements 422 (e.g., aluminum) radially disposed about a generally cylindrical composite core 400, which may be formed in accordance with the present invention. The conductive elements may be arranged in a single layer or in multiple layers. In the illustrated embodiment, for example, the conductive elements 422 are arranged to form a first concentric layer 426 and a second concentric layer 428. Of course, any number of concentric layers may be employed. The shape of the conductive elements 422 may also be varied to optimize the number of elements that can be disposed about the composite core 400. In the illustrated embodiment, for example, the conductive elements 422 have a trapezoidal cross sectional shape. Of course, other shapes may also be employed, such as circular, elliptical, rectangular, square, etc. The conductive elements 422 may also be twisted or wrapped around the core 400 in any desired geometrical configuration, such as in a helical manner.

Referring to FIG. 10, for instance, another embodiment of a transmission line generally 420 is shown. As illustrated, the transmission line 420 includes a plurality of conductive elements 422 (e.g., aluminum) radially disposed about a bundle of generally cylindrical composite cores 400, which may be formed in accordance with the present invention. FIG. 10 illustrates six core rods 400 surrounding a single core rod 400, although any suitable number of cores 400 in any suitable arrangement is within the scope and spirit of the present disclosure. A capping layer 519 also extends around the perimeter of and defines an external surface of each core 400. The conductive elements may be arranged in a single layer or in multiple layers. In the illustrated embodiment, for example, the conductive elements 422 are arranged to form a first concentric layer 426 and a second concentric layer 428. Of course, any number of concentric layers may be employed. The shape of the conductive elements 422 may also be varied to optimize the number of elements that can be disposed about the composite core 400. In the illustrated embodiment, for example, the conductive elements 422 have a trapezoidal cross sectional shape. Of course, other shapes may also be employed, such as circular, elliptical, rectangular, square, etc. The conductive elements 422 may also be twisted or wrapped around the bundle of core rods 400 in any desired geometrical configuration, such as in a helical manner.

The composite core of the present invention provides various advantages and benefits especially when used to construct transmission wires. For example, due to its construction, the core may represent a unitary and consolidated structure that not only allows for easy handling, but also provides various advantages with respect to strength and integrity.

The present disclosure may be better understood with reference to the following examples.

EXAMPLE 1

Two (2) continuous fiber ribbons were initially formed using an extrusion system as substantially described above. Carbon fiber ravings (Toray T700SC, which contained 12,000 carbon filaments having a tensile strength of 4,900 MPa and a mass per unit length of 0.8 grams per meter) were employed for the continuous fibers with each individual ribbon containing 4 ravings. The thermoplastic polymer used to impregnate the fibers was polyphenylene sulfide ("PPS") (FORTRONO PPS 205, available from Ticona, LLC), which has a melting point of about 280° C. Each ribbon contained 50 wt. % carbon fibers and 50 wt. % PPS. The ribbons had a thickness of about 0.18 millimeters and a void fraction of less than 1.0%. Once formed, the ribbons were then fed to a pultrusion line operating at a speed of 20 feet per minute. Before shaping, the ribbons were heated within an infrared oven (power setting of 305). The heated ribbons were then supplied to a consolidation die having a circular-shaped channel that received the ribbons and compressed them together while forming the initial shape of the rod. Within the die, the ribbons remained at a temperature of about 177° C. Upon consolidation, the resulting preform was then briefly cooled with an air ring/tunnel device that supplied ambient air at a pressure of 1 psi. The preform was then passed through a nip formed between two rollers, and then to a calibration die for final shaping. Within the calibration die, the preform remained at a temperature of about 140° C. After exiting this die the profile was capped with a polyether ether ketone ("PEEK"), which had a melting point of 350° C. The capping layer had a thickness of about 0.1 millimeters. The resulting part was then cooled with an air stream. The resulting rod had a diameter of about 3.5 millimeters, and contained 45 wt. % carbon fibers, 50 wt. % PPS, and 5 wt. % capping material.

To determine the strength properties of the rod, three-point flexural testing was performed in accordance with ASTM D790-10, Procedure A. The support and nose radius was 0.250 inch, the support span was 30 millimeter, the specimen length was 2 inches, and the test speed was 2 millimeters per minute. The resulting flexural modulus was about 31 Gigapascals and the flexural strength was about 410 MPa. The density of the part was 1.48 g/cm$^3$ and the void content was less than about 3%. Likewise, the bend radius was 3.27 centimeters.

EXAMPLE 2

Two (2) continuous fiber ribbons were initially formed using an extrusion system as substantially described above. Carbon fiber rovings (Toray T700SC) were employed for the continuous fibers with each individual ribbon containing 4 rovings. The thermoplastic polymer used to impregnate the fibers was FORTRON® PPS 205. Each ribbon contained 50 wt. % carbon fibers and 50 wt. % PPS. The ribbons had a thickness of about 0.18 millimeters and a void fraction of less than 1.0%. Once formed, the ribbons were then fed to a pultrusion line operating at a speed of 20 feet per minute. Before shaping, the ribbons were heated within an infrared oven (power setting of 305). The heated ribbons were then supplied to a consolidation die having a circular-shaped channel that received the ribbons and compressed them together while forming the initial shape of the rod. Within the die, the ribbons remained at a temperature of about 343° C. Upon consolidation, the resulting preform was then briefly cooled with an air ring/tunnel device that supplied ambient air at a pressure of 1 psi. The preform was then passed through a nip formed between two rollers, and then to a calibration die for final shaping. Within the calibration die, the preform remained at a temperature of about 140° C. After exiting this die the profile was capped with FORTRON® PPS 320, which had a melting point of 280° C. The capping layer had a thickness of about 0.1 millimeters. The resulting part was then cooled with an air stream. The resulting rod had a diameter of about 3.5 millimeters, and contained 45 wt. % carbon fibers, 50 wt. % PPS, and 5 wt. % capping material.

To determine the strength properties of the rod, three-point flexural testing was performed in accordance with ASTM D790-10, Procedure A. The support and nose radius was 0.250 inch, the support span was 30 millimeter, the specimen length was 2 inches, and the test speed was 2 millimeters per minute. The resulting flexural modulus was 20.3 Gigapascals and the flexural strength was about 410 MPa. The density of the part was 1.48 g/cm$^3$ and the void content was less than about 3%. Likewise, the bend radius was 4.37 centimeters.

EXAMPLE 3

Two (2) continuous fiber ribbons were initially formed using an extrusion system as substantially described above. Glass fiber rovings (TUFRov® 4588 from PPG, which contained E-glass filaments having a tensile strength of 2599 MPa and a mass per unit length of 2.2 grams per meter) were employed for the continuous fibers with each individual ribbon containing 2 ravings. The thermoplastic polymer used to impregnate the fibers was polyphenylene sulfide ("PPS") (FORTRON® 205, available from Ticona, LLC), which has a melting point of about 280° C. Each ribbon contained 56 wt. % glass fibers and 44 wt. % PPS. The ribbons had a thickness of about 0.18 millimeters and a void fraction of less than 1.0%. Once formed, the ribbons were then fed to a pultrusion line operating at a speed of 20 feet per minute. Before shaping, the ribbons were heated within an infrared oven (power setting of 330). The heated ribbons were then supplied to a consolidation die having a circular-shaped channel that received the ribbons and compressed them together while forming the initial shape of the rod. Upon consolidation, the resulting preform was then briefly cooled with ambient air. The preform was then passed through a nip formed between two rollers, and then to a calibration die for final shaping. Within the calibration die, the preform remained at a temperature of about 275° C. After exiting this die, the profile was capped with FORTRON® 205. The capping layer had a thickness of about 0.1 millimeters. The resulting part was then cooled with an air stream. The resulting rod had a diameter of about 3.5 millimeters, and contained 50 wt. % glass fibers and 50 wt. % PPS.

To determine the strength properties of the rod, three-point flexural testing was performed in accordance with ASTM D790-10, Procedure A. The support and nose radius was 0.250 inch, the support span was 30 millimeter, the specimen length was 2 inches, and the test speed was 2 millimeters per minute. The resulting flexural modulus was about 18 Gigapascals and the flexural strength was about 590 MPa. The void content was less than about 0% and the bend radius was 1.87 centimeters.

EXAMPLE 4

Two (2) continuous fiber ribbons were initially formed using an extrusion system as substantially described above. Glass fiber rovings (TUFRov® 4588) were employed for the continuous fibers with each individual ribbon containing 2 rovings. The thermoplastic polymer used to impregnate the fibers was Nylon 66 (PA66), which has a melting point of about 250° C. Each ribbon contained 60 wt. % glass fibers and 40 wt. % Nylon 66. The ribbons had a thickness of about 0.18 millimeters and a void fraction of less than 1.0%. Once formed, the ribbons were then fed to a pultrusion line operating at a speed of 10 feet per minute. Before shaping, the ribbons were heated within an infrared oven (power setting of 320). The heated ribbons were then supplied to a consolidation die having a circular-shaped channel that received the ribbons and compressed them together while forming the initial shape of the rod. Upon consolidation, the resulting preform was then briefly cooled with ambient air. The preform was then passed through a nip formed between two rollers, and then to a calibration die for final shaping. Within the calibration die, the preform remained at a temperature of about 170° C. After exiting this die, the profile was capped with Nylon 66. The capping layer had a thickness of about 0.1 millimeters. The resulting part was then cooled with an air stream. The resulting rod had a diameter of about 3.5 millimeters, and contained 53 wt. % glass fibers, 40 wt. % Nylon 66, and 7 wt. % capping material.

To determine the strength properties of the rod, three-point flexural testing was performed in accordance with ASTM D790-10, Procedure A. The support and nose radius was 0.250 inch, the support span was 30 millimeter, the specimen length was 2 inches, and the test speed was 2 millimeters per minute. The resulting flexural modulus was about 19 Gigapascals and the flexural strength was about 549 MPa. The void content was less than about 0% and the bend radius was 2.34 centimeters.

EXAMPLE 5

Three (3) batches of eight (8) rods were formed having different void fraction levels. For each rod, two (2) continuous fiber ribbons were initially formed using an extrusion system as substantially described above. Carbon fiber rovings (Toray T700SC, which contained 12,000 carbon filaments having a tensile strength of 4,900 MPa and a mass per unit length of 0.8 grams per meter) were employed for the continuous fibers with each individual ribbon containing 4 rovings. The thermoplastic polymer used to impregnate the fibers was polyphenylene sulfide ("PPS") (FORTRON® PPS 205, available from Ticona, LLC), which has a melting point of about 280° C. Each ribbon contained 50 wt. % carbon fibers and 50 wt. % PPS. The ribbons had a thickness of about 0.18 millimeters and a void fraction of less than 1.0%. Once formed, the ribbons were then fed to a pultrusion line operating at a speed of 20 feet per minute. Before shaping, the ribbons were heated within an infrared oven (power setting of 305). The heated ribbons were then supplied to a consolidation die having a circular-shaped channel that received the ribbons and compressed them together while forming the initial shape of the rod. Within the die, the ribbons remained at a temperature of about 177° C. Upon consolidation, the resulting preform was then briefly cooled with an air ring/tunnel device that supplied ambient air at a pressure of 1 psi. The preform was then passed through a nip formed between two rollers, and then to a calibration die for final shaping. Within the calibration die, the preform remained at a temperature of about 140° C. After exiting this die the profile was capped with a polyether ether ketone ("PEEK"), which had a melting point of 350° C. The capping layer had a thickness of about 0.1 millimeters. The resulting part was then cooled with an air stream. The resulting rod had a diameter of about 3.5 millimeters, and contained 45 wt. % carbon fibers, 50 wt. % PPS, and 5 wt % capping material.

A first batch of rods had a mean void fraction of 2.78%. A second batch of rods had a mean void fraction of 4.06%. A third batch of rods had a mean void fraction of 8.74%. Void fraction measurement was performed using CT scanning. A Metrotom 1500 (2 k×2 k) high resolution detector was used to scan the rod specimens. Detection was done using an enhanced analysis mode with a low probability threshold. Once the specimens were scanned for void fraction, Volume Graphics software was used to interpret the data from the 3D scans, and calculate the void levels in each specimen.

To determine the flexural fatigue life and residual flexural strength of the rods, three-point flexural fatigue testing was performed in accordance with ASTM D790. The support span was 2.2 inches and the specimen length was 3 inches. Four (4) rods from each batch were tested at a loading level of 160 Newtons ("N") and four (4) rods from each batch were tested at a loading level of 180 N, respectively representing about 50% and 55% of the pristine (static) flexural strength of the rods. Each specimen was tested to one million cycles at a frequency of 10 Hertz (Hz).

Before and after fatigue testing, to determine the respective pristine and residual flexural strength properties of the rods, three-point flexural testing was performed in accordance with ASTM D790-10, Procedure A. The average pristine and residual flexural strengths of each batch at each loading level were recorded. The resulting pristine flexural strength for the third batch was 107 ksi, and the resulting residual flexural strength for the third batch was 75 ksi, thus resulting in a reduction of about 29%. The resulting pristine flexural strength for the second batch was 108 ksi, and the resulting residual flexural strength for the second batch was 72 ksi, thus resulting in a reduction of about 33%. The resulting pristine flexural strength for the first batch was 106 ksi, and the resulting residual flexural strength for the first batch was 105 ksi, thus resulting in a reduction of about 1%.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrical transmission cable core, wherein the core extends in a longitudinal direction and comprises:
    at least one rod that contains a continuous fiber component comprising a plurality of consolidated thermoplastic impregnated rovings, the rovings containing continuous carbon fibers oriented in the longitudinal direction and a thermoplastic matrix that embeds the fibers, wherein the continuous carbon fibers constitute from about 25 wt. % to about 80 wt. % of the rod and the thermoplastic matrix constitutes from about 20 wt. % to about 75 wt. % of the rod; and
    a capping layer surrounding the continuous fiber component, wherein the capping layer has about 1 wt. % or less of continuous carbon fibers;
    wherein the rod has a minimum flexural modulus of about 10 Gigapascals, and wherein the rod has a tensile modulus of elasticity of about 50 Gigapascals or more.

2. The core of claim 1, wherein the continuous fibers have a ratio of ultimate tensile strength to mass per unit length of greater than about 1,000 Megapascals per gram per meter.

3. The core of claim 1, wherein the thermoplastic matrix includes a polyarylene sulfide.

4. The core of claim 3, wherein the polyarylene sulfide is polyphenylene sulfide.

5. The core of claim 1, wherein the capping layer comprises a polyether ether ketone.

6. The core of claim 1, wherein the continuous fibers constitute from about 30 wt. % to about 75 wt. % of the rod.

7. The core of claim 1, wherein the rod has a void fraction of about 3% or less.

8. The core of claim 1, wherein the rod has a flexural modulus of from about 15 to about 200 Gigapascals.

9. The core of claim 1, wherein the rod has a flexural modulus of from about 20 to about 150 Gigapascals.

10. The core of claim 1, wherein the rod has an ultimate tensile strength of about 300 Megapascals or more.

11. The core of claim 1, wherein the rod has an ultimate tensile strength of from about 400 Megapascals to about 5,000 Megapascals.

12. The core of claim 1, wherein the rod has a linear thermal expansion coefficient in the longitudinal direction in a range from about −0.25 to about 5 ppm per ° C.

13. The core of claim 1, wherein the capping layer contains a thermoplastic polymer having a dielectric strength of at least about 2 KV/mm.

14. The core of claim 1, wherein the capping layer comprises at least one additive comprising one of a mineral reinforcing agent, a lubricant, a flame retardant, a blowing agent, a foaming agent, an ultraviolet light resistant agent, a thermal stabilizer, or a pigment.

15. An electrical transmission cable core, wherein the core extends in a longitudinal direction and comprises:
    at least one rod that contains a continuous fiber component comprising a plurality of consolidated thermoplastic impregnated rovings, the rovings containing continuous fibers oriented in the longitudinal direction and a thermoplastic matrix that embeds the fibers, the thermoplastic matrix including a polyarylene sulfide, wherein the continuous fibers constitute from about 25 wt. % to about 80 wt. % of the rod and the thermoplastic matrix constitutes from about 20 wt. % to about 75 wt. % of the rod; and
    a capping layer surrounding the continuous fiber component, wherein the capping layer has about 1 wt. % or less of continuous fibers;
    wherein the rod has a flexural modulus of from about 15 to about 200 Gigapascals, and wherein the rod has a void fraction of about 3% or less.

16. The core of claim 15, wherein the continuous fibers have a ratio of ultimate tensile strength to mass per unit length of greater than about 1,000 Megapascals per gram per meter.

17. The core of claim 15, wherein the continuous fibers are carbon fibers.

18. The core of claim 15, wherein the polyarylene sulfide is polyphenylene sulfide.

19. The core of claim 15, wherein the capping layer comprises a polyether ether ketone.

20. The core of claim 15, wherein the continuous fibers constitute from about 30 wt. % to about 75 wt. % of the rod.

21. The core of claim 15, wherein the rod has a flexural modulus of from about 20 to about 150 Gigapascals.

22. The core of claim 15, wherein the rod has an ultimate tensile strength of about 300 Megapascals or more.

23. The core of claim 15, wherein the rod has an ultimate tensile strength of from about 400 Megapascals to about 5,000 Megapascals.

24. The core of claim 15, wherein the rod has a tensile modulus of elasticity of about 50 Gigapascals or more.

25. The core of claim 15, wherein the rod has a linear thermal expansion coefficient in the longitudinal direction in a range from about −0.25 to about 5 ppm per ° C.

26. The core of claim 15, wherein the rod has a diameter of from about 0.1 to about 50 millimeters.

27. The core of claim 15, wherein the capping layer contains a thermoplastic polymer having a dielectric strength of at least about 2 KV/mm.

28. The core of claim 15, wherein the capping layer comprises at least one additive comprising one of a mineral reinforcing agent, a lubricant, a flame retardant, a blowing agent, a foaming agent, an ultraviolet light resistant agent, a thermal stabilizer, or a pigment.

29. An electrical transmission cable core, wherein the core extends in a longitudinal direction and comprises:
- at least one rod that contains a continuous fiber component comprising a plurality of consolidated thermoplastic impregnated rovings, the rovings containing continuous fibers oriented in the longitudinal direction and a thermoplastic matrix that embeds the fibers, wherein the continuous fibers constitute from 30 wt. % to 75 wt. % of the rod and the thermoplastic matrix constitutes from 25 wt. % to 70 wt. % of the rod; and
- a capping layer surrounding the continuous fiber component, wherein the capping layer has 1 wt. % or less of continuous fibers;
- wherein the rod has a flexural modulus of from 15 to 200 Gigapascals and an ultimate tensile strength of 300 Megapascals or more;
- wherein the rod has a diameter of from 0.1 to 50 millimeters.

30. The core of claim 29, wherein the continuous fibers have a ratio of ultimate tensile strength to mass per unit length of greater than 1,000 Megapascals per gram per meter.

31. The core of claim 29, wherein the thermoplastic matrix includes a polyarylene sulfide.

32. The core of claim 31, wherein the polyarylene sulfide is polyphenylene sulfide.

33. The core of claim 29, wherein the capping layer comprises a polyether ether ketone.

34. The core of claim 29, wherein the rod has a void fraction of 3% or less.

35. The core of claim 29, wherein the rod has a flexural modulus of from 20 to 150 Gigapascals.

36. The core of claim 29, wherein the rod has an ultimate tensile strength of from 400 Megapascals to 5,000 Megapascals.

37. The core of claim 29, wherein the rod has a tensile modulus of elasticity of 50 Gigapascals or more.

38. The core of claim 29, wherein the rod has a linear thermal expansion coefficient in the longitudinal direction in a range from −0.25 to 5 ppm per ° C.

39. The core of claim 29, wherein the capping layer contains a thermoplastic polymer having a dielectric strength of at least 2 KV/mm.

40. The core of claim 29, wherein the capping layer comprises at least one additive comprising one of a mineral reinforcing agent, a lubricant, a flame retardant, a blowing agent, a foaming agent, an ultraviolet light resistant agent, a thermal stabilizer, or a pigment.

* * * * *